United States Patent
Ueki et al.

(10) Patent No.: US 9,976,718 B2
(45) Date of Patent: May 22, 2018

(54) DAYLIGHTING DEVICE

(71) Applicant: SHARP KABUSHIKI KAISHA, Sakai, Osaka (JP)

(72) Inventors: Shun Ueki, Sakai (JP); Tsuyoshi Kamada, Sakai (JP); Tomoko Ueki, Sakai (JP); Shumpei Nishinaka, Sakai (JP); Toru Kanno, Sakai (JP); Hideomi Yui, Sakai (JP); Daisuke Shinozaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days. days.

(21) Appl. No.: 15/310,261

(22) PCT Filed: May 12, 2015

(86) PCT No.: PCT/JP2015/063600
§ 371 (c)(1),
(2) Date: Nov. 10, 2016

(87) PCT Pub. No.: WO2015/174401
PCT Pub. Date: Nov. 19, 2015

(65) Prior Publication Data
US 2017/0146208 A1 May 25, 2017

(30) Foreign Application Priority Data
May 12, 2014 (JP) .................................. 2014-099084

(51) Int. Cl.
*F21S 11/00* (2006.01)
*E06B 9/24* (2006.01)
(Continued)

(52) U.S. Cl.
CPC ............... *F21S 11/007* (2013.01); *B32B 3/30* (2013.01); *B32B 17/10431* (2013.01);
(Continued)

(58) Field of Classification Search
CPC ... F21S 11/007; G02B 5/0215; G02B 5/0242; G02B 5/0257
See application file for complete search history.

(56) References Cited

U.S. PATENT DOCUMENTS 3,096,684 A * 7/1963 Warnke ..................... E04C 1/42
359/593
5,461,496 A 10/1995 Kanada et al.
(Continued)

FOREIGN PATENT DOCUMENTS

JP 58-146689 9/1983
JP 06-033671 2/1994
(Continued)

OTHER PUBLICATIONS

International Search Report for PCT/JP2015/063600, dated Jul. 21, 2015, 5 pages.
(Continued)

*Primary Examiner* — Christopher Mahoney
(74) *Attorney, Agent, or Firm* — ScienBiziP, P.C.

(57) ABSTRACT

A daylighting device (10) according to an aspect of the present invention includes a first substrate (1) which has optical transparency and to which external light is incident; a second substrate (2) which has optical transparency and is disposed facing the first substrate (1); a light diffusion layer (3) which is disposed between the first substrate (1) and the second substrate (2); and a daylighting layer (4) which is disposed between the first substrate (1) and the second substrate (2) and is formed by including a plurality of daylighting portions (42) having optical transparency and a void portion (43) which is provided between the plurality of daylighting portions (42) in one surface facing the light diffusion layer (3).

19 Claims, 23 Drawing Sheets

(51) Int. Cl.
- G02B 3/06 (2006.01)
- G02B 5/00 (2006.01)
- G02B 5/02 (2006.01)
- B32B 3/30 (2006.01)
- B32B 17/10 (2006.01)
- E06B 3/67 (2006.01)

(52) U.S. Cl.
CPC .. *B32B 17/10568* (2013.01); *B32B 17/10743* (2013.01); *E06B 3/67* (2013.01); *E06B 9/24* (2013.01); *G02B 3/06* (2013.01); *G02B 5/00* (2013.01); *G02B 5/02* (2013.01); *G02B 5/0215* (2013.01); *G02B 5/0242* (2013.01); *G02B 5/0257* (2013.01); *G02B 5/0284* (2013.01); *E06B 2009/2417* (2013.01)

(56) References Cited

U.S. PATENT DOCUMENTS

| | | | |
|---|---|---|---|
| 6,111,696 A * | 8/2000 | Allen | G02B 5/3008 349/96 |
| 6,517,914 B1 | 2/2003 | Hiraishi | |
| 8,619,363 B1 * | 12/2013 | Coleman | G02B 5/18 359/576 |
| 9,429,288 B2 * | 8/2016 | Ueki | E06B 9/386 |
| 2008/0291541 A1 * | 11/2008 | Padiyath | E06B 9/24 359/569 |
| 2009/0009870 A1 | 1/2009 | Usami | |
| 2012/0033302 A1 | 2/2012 | Suzuki et al. | |
| 2013/0033873 A1 | 2/2013 | Suzuki et al. | |
| 2014/0104689 A1 * | 4/2014 | Padiyath | G02B 5/0242 359/592 |
| 2017/0023197 A1 * | 1/2017 | Ueki | G02B 5/0215 |

FOREIGN PATENT DOCUMENTS

| | | |
|---|---|---|
| JP | 11-081813 | 3/1999 |
| JP | 2001-159704 | 6/2001 |
| JP | 3491895 | 1/2004 |
| JP | 2008-040021 | 2/2008 |
| JP | 2011-227120 | 11/2011 |
| JP | 2012-038626 | 2/2012 |
| JP | 2014-044305 | 3/2014 |

OTHER PUBLICATIONS

Written Opinion of the International Searching Authority for PCT/JP2015/063600, dated Jul. 21, 2015, 5 pages (JP Language).

"Optibend" online, Home Page of Chi Lin Technology Co., Ltd, retrieved on Mar. 7, 2014, 2 pages.

* cited by examiner

| | INTENSITY AT -5 DEGREES | GLARE | COLOR BREAKUP |
|---|---|---|---|
| (1) | 12.1 | △ | ○ |
| (2) | 7.5 | ○ | ○ |
| (3) | 1.0 | ○ | ○ |
| (4) | 0.09 | ○ | △ |

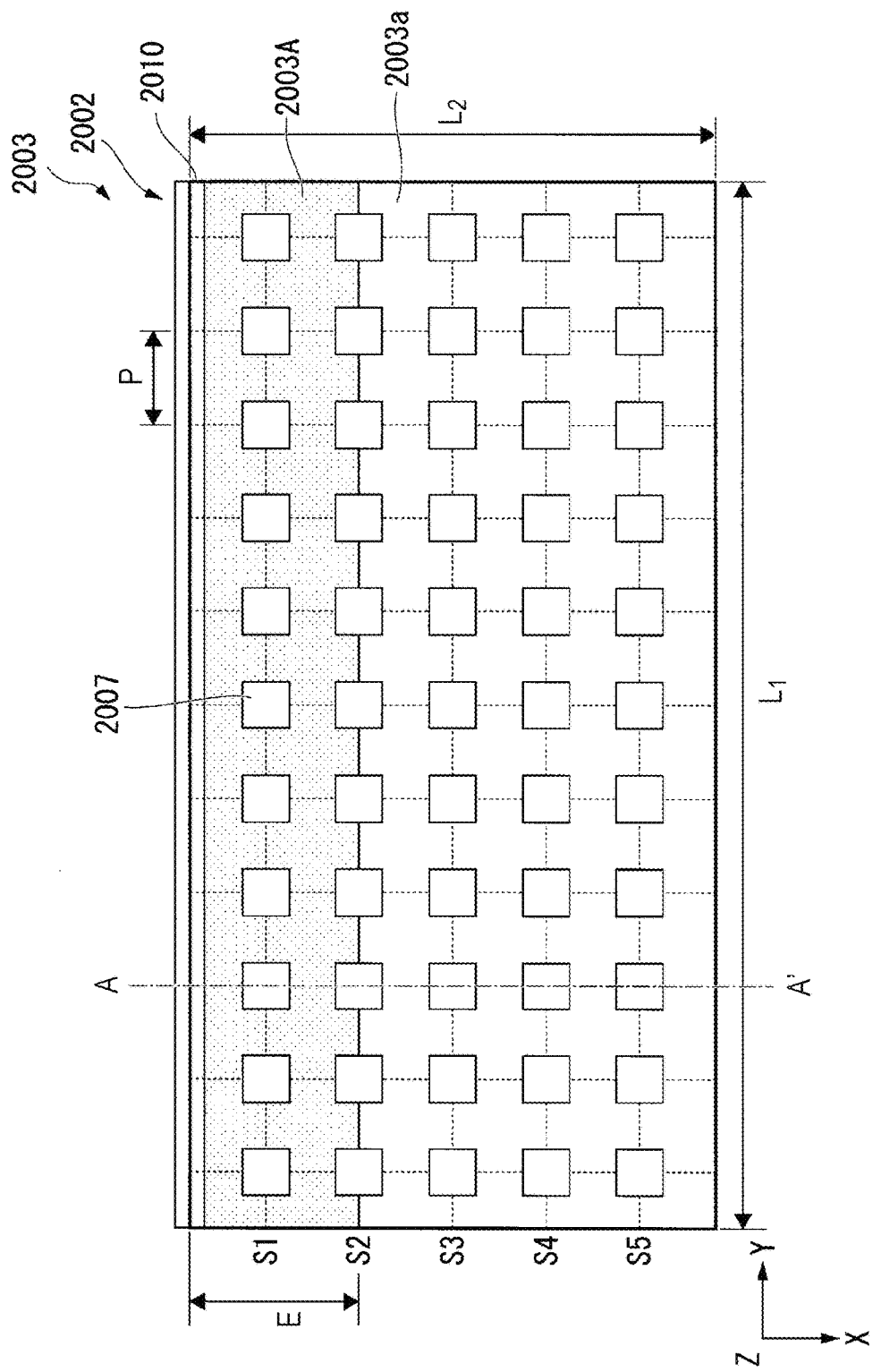

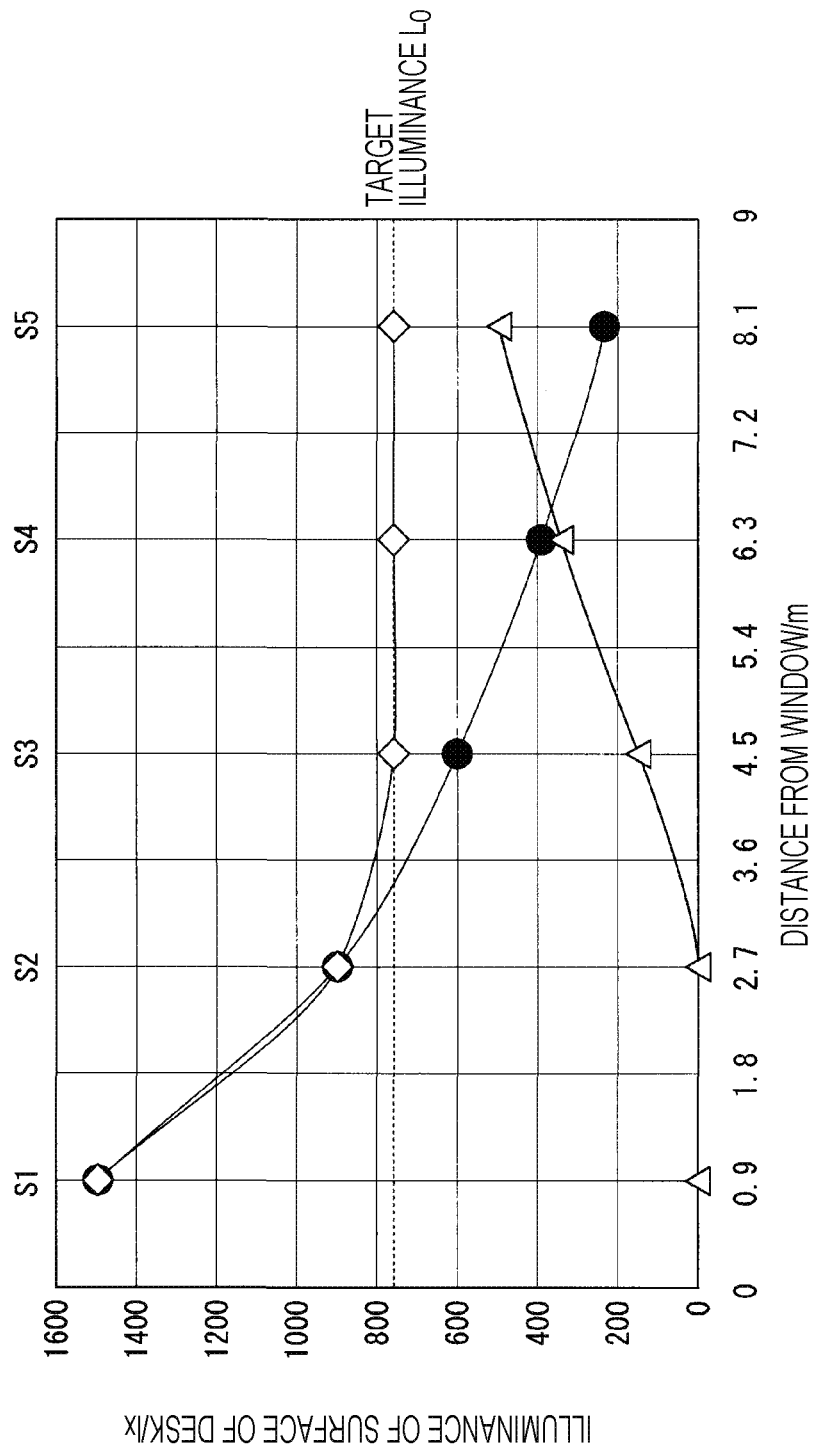

DAYLIGHTING DEVICE

TECHNICAL FIELD

The present invention relates to a daylighting device.

This application is the U.S. National phase of International Application No. PCT/JP2015/063600 filed May 12, 2015, which designated the U.S. and claims priority to Japanese Patent Application No. 2014-099084, filed May 12, 2014, the contents of each of which are incorporated herein by reference.

BACKGROUND ART

A daylighting layer for collecting solar light into indoors through a window or the like of a building is proposed in PTL 1. In the daylighting layer, a plurality of unit prisms and a flat surface are formed in one surface of a support with optical transparency. The solar light is collected indoors through the unit prism. By disposing such a daylighting layer to a window glass, a bright space can be provided by introducing external light indoors.

In recent year, from the viewpoint of energy conservation, there are required for improving of heat insulating properties in the window portion. Since the above-described daylighting layer is used in a state where the daylighting layer is attached to an indoor side of the window glass, the heat is also entered indoors in addition to external light. As a result, there is a problem in that unnecessary air-conditioning cost is generated due to the heat in summer season.

As a test for improving the heat insulating properties of the window portion, improving the heat insulating properties by disposing the double window glasses is well known. In NPL 1, a configuration, in which a daylighting layer is disposed between two window glasses which are disposed facing each other, is proposed.

CITATION LIST

Patent Literature

PTL 1: Japanese Unexamined Patent Application Publication No. 2008-40021

Non Patent Literature

NPL 1: "Optibend" [online], Homepage of CHI LIN TECHNOLOGY CO., LTD [Searching Mar. 7, 2014], Internet <URL: http://www.chilintech.com.tw/>

SUMMARY OF INVENTION

Technical Problem

However, in the conventional configuration, the brightness indoors is easily influenced of an incident direction of the solar light and since directional characteristics of the light to be entered indoors is too strong, a shadow is easily generated indoors. In addition, there is a problem in that glare is generated in the daylighting layer when viewing the window glass from the indoor side or the outdoor side.

An aspect of the present invention was accomplished in light of the above problems of the conventional technique. An object of the invention is to provide a daylighting device which maintains insulating properties and which is capable of obtaining a stabilized bright light environment without being affected by the incident direction of the solar light.

Solution to Problem

A daylighting device that is an aspect of the present invention includes: a first substrate which has optical transparency and to which external light is incident; a second substrate which has optical transparency and is disposed facing the first substrate; a light diffusion layer which is disposed between the first substrate and the second substrate; and a daylighting layer which is disposed between the first substrate and the second substrate and is formed by including a plurality of daylighting portions having optical transparency and a void portion which is provided between the plurality of daylighting portions in one surface facing the light diffusion layer.

In the daylighting device that is the aspect of the present invention, a configuration, in which the light diffusion layer has anisotropy in light diffusion properties and shows the strong light diffusion properties in each of extending directions in the plurality of daylighting portions, may be provided.

In the daylighting device that is the aspect of the present invention, a configuration, in which the light diffusion layer shows weak light diffusion properties having 5 degrees or less of a full width at half maximum in a direction perpendicular (vertically) to the extending direction of the plurality of daylighting portions, may be provided.

In the daylighting device that is the aspect of the present invention, a configuration, in which as properties of light diffusion in a direction perpendicular to an extending direction of the plurality of daylighting portions, the light diffusion layer serves as a reflective surface in which a part of a side surface of the daylighting portion adjacent to the void portion reflects the light which is incident to the daylighting portion, the light passes through a point G in which one arbitrary light beam among the light beams which are incident to the daylighting portions is incident to the reflective surface, and in a case where among two spaces which use a virtual straight line which is perpendicular to a first surface of the first substrate as a boundary, a space at a side where the light beam to be incident to the point G is present is set as a first space and a space at a side where the light beam to be incident to the point G is not present is set as a second space, a diffusion intensity of the light travelling in a direction at a polar angle of 5 degrees with respect to the straight line that is a light travelling the side of the second space among the light beams emitted from the daylighting portions is 0.1% to 10% of the intensity of the light travelling along the straight line, may be provided.

The daylighting device that is the aspect of the present invention, may further include a third substrate which is disposed between the first substrate and the second substrate.

In the daylighting device that is the aspect of the present invention, a configuration, in which the light diffusion layer is disposed in a light incident side of the daylighting layer may be provided.

In the daylighting device that is the aspect of the present invention, a configuration, in which the light diffusion layer is provided on a surface of the first substrate facing the second substrate, and the daylighting layer is provided on a surface of the second substrate facing the first substrate, may be provided.

In the daylighting device that is the aspect of the present invention, a configuration, in which the light diffusion layer is set as a first light diffusion layer and includes a second light diffusion layer showing weak light diffusion properties than that of the first light diffusion layer, and the second light diffusion layer is disposed between the second substrate and the daylighting layer, may be provided.

In the daylighting device that is the aspect of the present invention, a configuration, in which the light diffusion layer is disposed at a light emission side of the daylighting layer, may be provided.

In the daylighting device that is the aspect of the present invention, a configuration, in which the daylighting layer and the light diffusion layer are provided in the surface of the second substrate facing the first substrate, may be provided.

In the daylighting device that is the aspect of the present invention, a configuration, in which the daylighting layer is provided on a surface of the third substrate facing the first substrate, and the light diffusion layer is provided on the surface of the second substrate facing the third substrate, may be provided.

In the daylighting device that is the aspect of the present invention, a configuration, in which the light diffusion layer and the daylighting layer are laminated on a surface of the second substrate facing the third substrate, may be provided.

In the daylighting device that is the aspect of the present invention, a configuration, in which the daylighting layer is provided on the surface of the third substrate facing the first substrate, and the light diffusion layer is provided on the surface of the third substrate facing the second substrate, may be provided.

In the daylighting device that is the aspect of the present invention, a configuration, in which the daylighting device includes the daylighting layer on the surface of the third substrate facing the first substrate, the daylighting device includes the light diffusion layer on the surface of the third substrate facing the second substrate, and the third substrate is supported at a distance with respect to at least one of the first substrate and the second substrate through a supporting member which is provided at the light diffusion layer side, may be provided.

In the daylighting device that is the aspect of the present invention, a configuration, in which the light diffusion layer is configured of a light transmissive resin and a plurality of light diffusion particles which have different refractive indexes from the light transmissive resin, and the light diffusion particles form an anisotropic shape having a long axis and a short axis, may be provided.

In the daylighting device that is the aspect of the present invention, a configuration, in which the light diffusion layer is formed of a plurality of convex portions extending in one direction, may be provided.

In the daylighting device that is the aspect of the present invention, a configuration, in which the plurality of convex portions are formed of lenticular lens structure, may be provided.

In the daylighting device that is the aspect of the present invention, a configuration, in which a planarizing layer planarizing a surface of the lenticular structure is further provided and the planarizing layer is formed of a material having the difference refractive index from the lenticular structure, may be provided.

In the daylighting device that is the aspect of the present invention, a configuration, in which an ultraviolet protecting layer is provided on the first substrate, may be provided.

In the daylighting device that is the aspect of the present invention, a configuration, in which the plurality of daylighting portions are formed of a polygonal-shaped structure, a cross-sectional shape perpendicular to a longitudinal direction has a plurality of apexes, has a polygonal shape in which all of inner angles are less than 180°, and the polygonal shape includes a first surface facing the one surface of the second substrate and a plurality of apexes including first and second apexes that are apexes corresponding to the both ends of the first surface and a third apex which is not positioned on the first surface, and the daylighting layer is provided in a posture in which an air interface at the third apex side is provided toward the first substrate side, may be provided.

Advantageous Effects of Invention

According to an aspect of the present invention, a daylighting device which maintains heat insulating properties and which is capable of providing a stabilized bright light environment without being affected by the solar light can be provided.

BRIEF DESCRIPTION OF DRAWINGS

FIG. 33 is a plan view illustrating a ceiling of the room model.

FIG. 34 is a graph illustrating a relationship between an illuminance of light (natural light) lighted indoors due to the daylighting device and an illuminance (illumination dimming system) due to an indoor illumination device.

DESCRIPTION OF EMBODIMENTS

Figure 1:
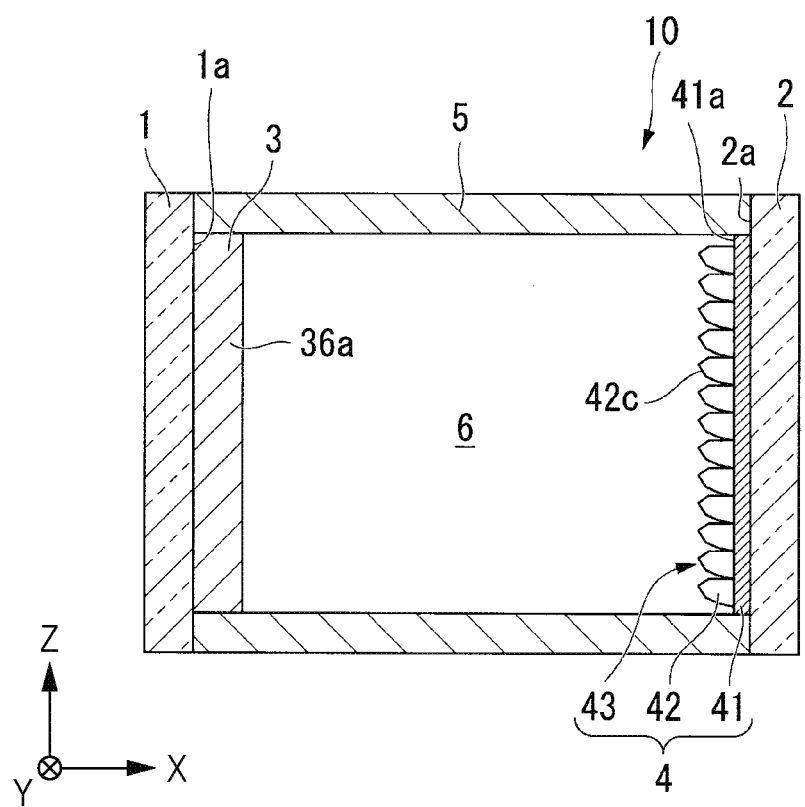
FIG. 1 is a cross-sectional view illustrating a configuration of a daylighting device that is a first embodiment of the present invention.

Hereinafter, an embodiment of the present invention will be described with reference made to the drawings. Note that in the drawings the scale of each component has been suitably altered in order to make each component a recognizable size.

First Embodiment

FIG. 1 is a cross-sectional view illustrating a configuration of a daylighting device that is a first embodiment of the present invention.

Figure 2:
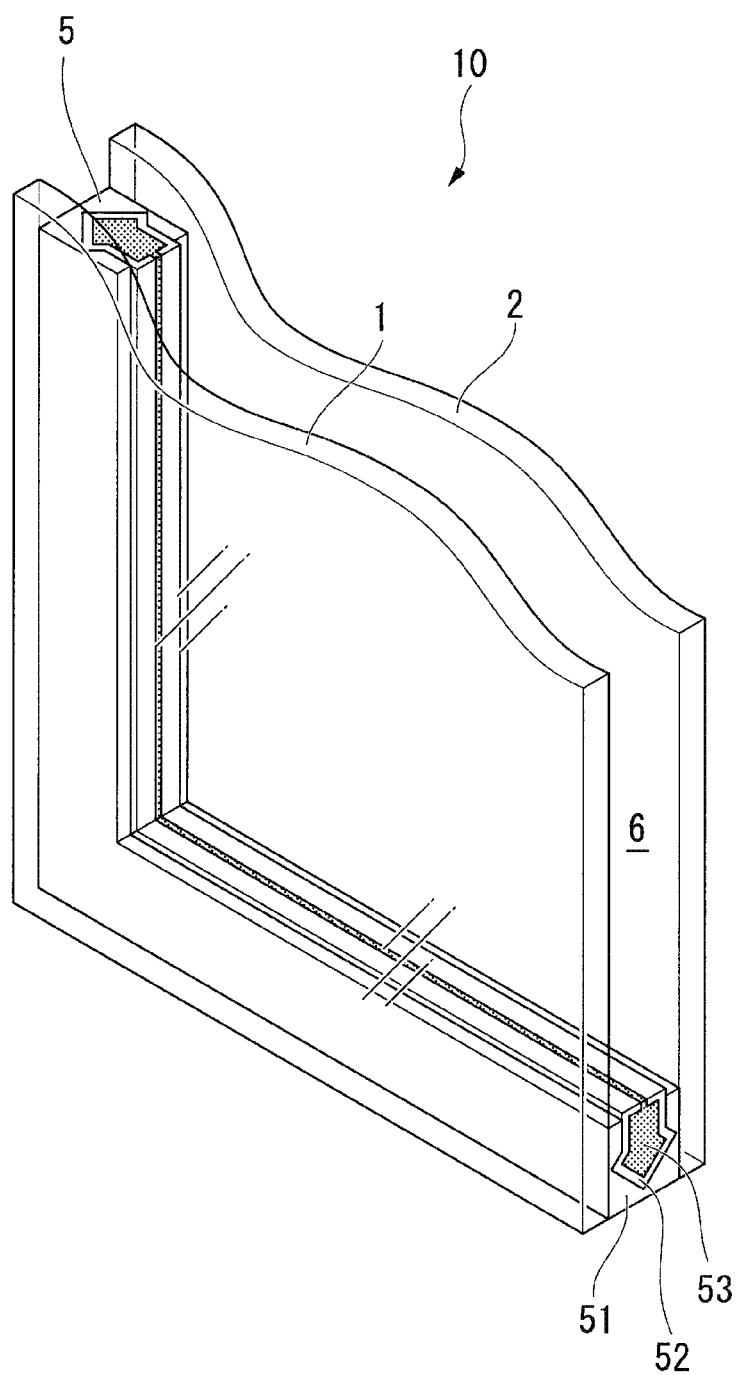
FIG. 2 is a perspective sectional view partially illustrating the configuration of the daylighting device.

FIG. 2 is a perspective sectional view partially illustrating the configuration of the daylighting device.

Figure 3:
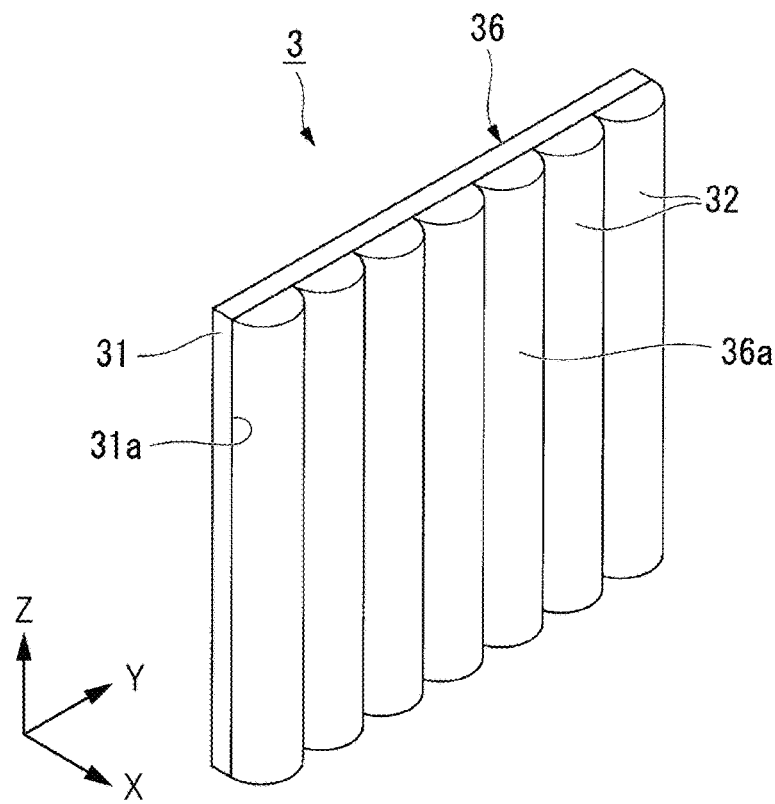
FIG. 3 is perspective view illustrating a configuration of a light diffusion layer.

FIG. 3 is perspective view illustrating a configuration of a light diffusion layer.

Figure 4:
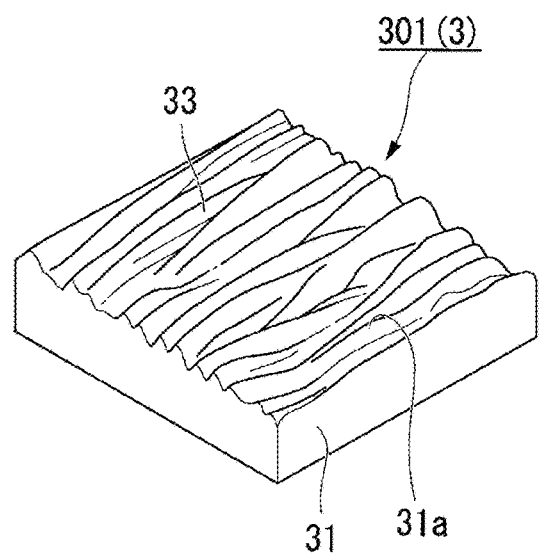
FIG. 4 is a diagram illustrating the light diffusion layer of a pseudo-stripe structure as the other form of the light diffusion layer.

FIG. 4 is a diagram illustrating the light diffusion layer of a pseudo-stripe structure as the other form of the light diffusion layer.

Figure 5:
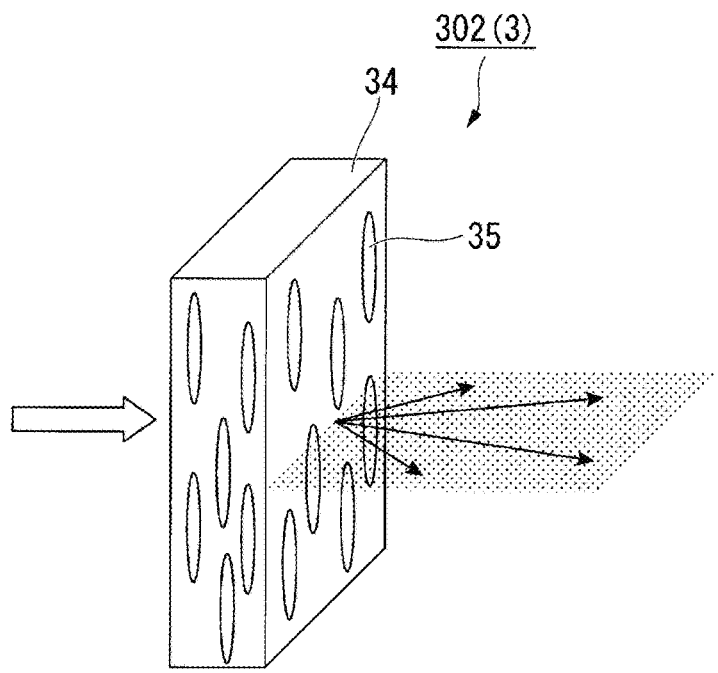
FIG. 5 is a diagram illustrating a structure including a light diffusion particle as the other form of the light diffusion layer.

FIG. 5 is a diagram illustrating a structure including a light diffusion particle as the other aspect of the light diffusion layer.

Figure 6:
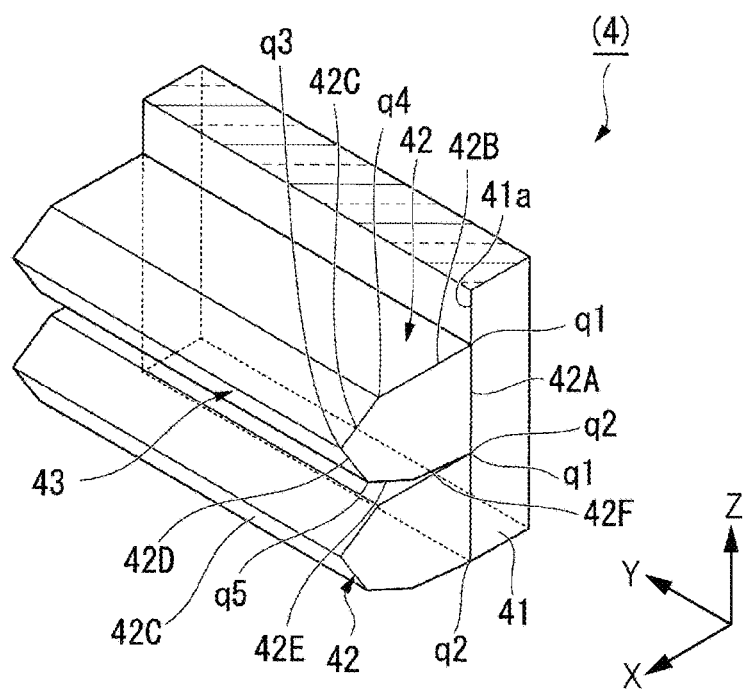
FIG. 6 is a perspective view illustrating a structure of a daylighting layer in detail.

FIG. 6 is a perspective view illustrating a structure of a daylighting layer.

The daylighting device according to the present embodiment is, for example, an example of the daylighting device for collecting the solar light (external light) indoors in a state where the daylighting device is assembled to a window frame indoors.

As illustrated in FIG. 1, a daylighting device 10 of the present embodiment is a window glass having a multiple glass structure (pair glass structure) which is mainly configured of a first substrate 1 and a second substrate 2 which are disposed facing each other. A light diffusion layer 3 and a daylighting layer 4 are disposed in a hollow heat-insulating layer (air layer) 6 which is formed between the first substrate 1 and the second substrate 2.

Each of the first substrate 1 and the second substrate 2 is formed of a glass substrate having optical transparency. The first substrate 1 is disposed in the outdoor side and the second substrate 2 is disposed to the indoor side. Peripheral portions of the first substrate 1 and the second substrate 2 are attached by a sealing member 5. A gap between the first substrate 1 and the second substrate 2 is about 12 mm.

As the glass substrate, a heat reflecting glass or a low radiation (low-E) glass in which an infrared reflection layer is formed in the surface by the specific metal film is used in addition to a front glass to be used in the common window.

As illustrated in FIG. 2, the sealing member 5 has a dual seal structure including a primary sealing material 51 and a secondary sealing material 52. The primary sealing material 51 is formed from a thermoplastic resin and is formed using a material with extremely low water vapor transmission and with excellent adhesiveness to the first substrate 1 and the second substrate 1.

The secondary sealing material 52 is a member having a high modulus value and is disposed in an inner portion of the primary sealing material 51.

Even when the hollow heat-insulating layer 6 which is formed between the first substrate 1 and the second substrate 2 is expanded by the reduction of a pressure in an increase in the temperature or an ambient atmosphere due to such a sealing member 5, tensile stress in the adhesive portion between the substrates 1 and 2 can be relieved. Therefore, the heat resistant performance of the multiple glass structure is maintained over a long period of time.

In addition, a drying member 53 is disposed at an inner side of the secondary sealing material 52. The drying member 53 absorbs moisture in the hollow heat-insulating layer 6. Therefore, it is set such that a dew condensation is not generated in inner surfaces 1a and 1a facing the hollow heat-insulating layer 6 side of the first substrate 1 and the second substrate 2.

In the present embodiment, the hollow heat-insulating layer 6 is set as an air layer formed of an air. However, the hollow heat-insulating layer 6 may be an inert gas layer formed of an inert gas such as nitrogen and may be a decompressed layer in a decompressed state.

The light diffusion layer 3 has anisotropy in the light diffusion properties and is configured to show the strong light diffusion properties in a Y direction (horizontal direction). In particular, as illustrated in FIG. 3, the light diffusion layer 3 is formed of a lenticular lens structure 36 which is configured of a supporting base material 31 and a plurality of convex lens portions (convex portion) 32 which are provided on a one surface 31a of the supporting base material 31. The light diffusion layer 3 is provided in a posture in which a lens surface 36a (surface) side is positioned on an inner surface 1a (a surface facing the second substrate 2) of the first substrate 1 as illustrated in FIG. 1 toward the second substrate 2 side. The plurality of convex lens portions 32 in the light diffusion layer 3 extend in a Z direction (vertical direction), respectively, and are arranged parallel to each other in the Y direction.

The lens surface 36a of the plurality of convex lens portions 32 has a curvature in a horizontal plane and has no curvature in the vertical direction. Accordingly, the plurality of convex lens portions 32 has a high light diffusion properties in the Y direction (horizontal direction) and has no light diffusion properties in the vertical direction. Therefore, the light which is incident to the light diffusion layer 3 is greatly spread to the Y direction (horizontal direction) when the light is emitted from the plurality of convex lens portions 32 and is emitted without spreading the light in the vertical direction.

In the plurality of convex lens portions 32, a one surface 31a side of the supporting base material 31 is processed to integrally form with the supporting base material 31 and may be formed separated from the supporting base material 31.

As the light diffusion layer 3, an aspect other than the above-described aspects may be used.

For example, as an example, in a light diffusion layer 301 (3), the one surface 31a side of the supporting base material 31 has a streak-like fine shape including a plurality of convex portions 33 extending in one direction as illustrated in FIG. 4.

In the light diffusion layer 301, the convex portions 33 extending roughly in the short-hand direction (Z direction) are arranged in the longitudinal direction (Y direction) of the supporting base material 31 and has a so-called pseudo-stripe structure. In this manner, as the light diffusion layer 301, the light diffusion layer having the pseudo-stripe structure, in which the light diffusion properties is provided in one direction and the light diffusion properties is rarely provided in the other direction perpendicular to the one direction. Therefore, the light diffusion layer 301 which shows the anisotropy in light scattering function can be obtained.

In the light diffusion layer 301, a light diffusion layer in which a factor where the light diffusion in the vertical direction is slightly is present preferable rather than the light diffusion layer in which the light diffusion is not generated. As a result, it plays a role of canceling a color breakup generated in the daylighting layer 4. By adopting the pseudo-stripe structure undulating in the vertical direction to the light diffusion layer 301, a light dispersion (color breakup) in the vertical direction which is generated in a case where white light is incident to a prism such as the daylighting layer 4 can be suppressed by adding the light diffusion element in the vertical direction. The weak light diffusion properties in this direction having a 5 degrees or less of the full width at half maximum is preferable. It is possibility that when the light in the vertical direction is greatly expanded, the light toward the ceiling is entered to the eyes of a person who is in a floor side with a high brightness. By suppressing the light diffusion properties in the vertical direction to the above level, the glare can be suppressed.

Furthermore, as the other aspect, as illustrated in FIG. 5, a light diffusion layer 302 (3) which is formed of a particle distribution film structure in which a plurality of a fiber shaped or ellipsoidal light diffusion particles 35 are dispersed such that the arrangement in the vertical direction (Z direction) is provided in a light transmissive resin layer (light transmissive resin) 34 that is a medium may be used. The light diffusion particle 35 has an anisotropic shape having a long axis and a short axis and is formed of material having different refractive indexes from the light transmissive resin layer 34. A plurality of light diffusion particles 35 becomes a light diffusion factor, and the light beam which is incident to the light transmissive resin layer 34 can be specifically dispersed and emitted in the Y direction (horizontal direction).

The daylighting layer 4 is a sheet in which a fine structure in order of several tens of μm to hundreds of μm is formed in the surface so as to guide the external light (solar light) indoors. Specifically, as illustrated in FIGS. 1 and 6, the daylighting layer 4 includes a film base material 41, a plurality of daylighting portions 42, and a void portion 43 which is provided between the plurality of daylighting portion 42, and is provided on an inner surface (a surface facing the light diffusion layer 3) 2a of the second substrate 2. The plurality of daylighting portions 42 are provided in a stripe shape on one surface 41a of the film base material 41, extend in the Y direction (horizontal direction), respectively, and disposed parallel to each other in the Z direction (vertical direction).

As the film base material 41, a light transmissive base material formed of a thermoplastic polymer or a light permeable resin such as a thermosetting resin, a photopolymerizable resin, or the like is used. The light transmissive base material formed of acrylic polymers, olefin polymers, vinyl polymers, cellulose polymers, amide-based polymer, fluorine-based polymer, urethane polymer, silicone polymer, an imide-based polymer, or the like is used. Specifically, light transmissive base material such as triacetyl cellulose (TAC), polyethylene terephthalate (PET), cycloolefin polymer (COP), polycarbonate (PC), polyethylene naphthalate (PEN), polyethersulfone (PES), polyimide (PI), or the like is preferably used. In addition, as an example, a PET film having a thickness of 100 μm is used. The total optical transparency of the film base material 41 is preferably 90% or more, for example. Therefore, sufficient transparency can be obtained.

For example, the plurality of daylighting portions 42 is configured of an organic material having a light transparency and a photosensitivity such as an acrylic resin or an epoxy resin, a silicone resin, or the like. In these resins, a mixture made of transparent resin which is obtained by mixing a polymerization initiator, a coupling agent, a monomer, an organic solvent, or the like can be used.

Furthermore, the polymerization initiator may include various addition components such as a stabilizer, an inhibitor, a plasticizer, an optical brightener, a mold release agent, a chain transfer agent, other photopolymerizable monomers, or the like.

In the present embodiment, as an example of the daylighting portion 42, a polymethyl methacrylate resin (PMMA) is used. The total optical transparency of the daylighting portion 42 is preferably 90% or more under the provisions of JIS K7361-1. Therefore, sufficient transparency can be obtained.

In the present embodiment, the plurality of daylighting portions 42 is formed on the film base material 41 using a thermal imprint method. As a forming method of the daylighting portion 42, it is not limited to the thermal imprint method, for example, a UV imprint method, a thermal press method, an emission molding method, an extraction molding, and a compressing molding may be used. In the method such as a melt-extrusion method or an embossing method, the film base material 41 and the daylighting portion 42 are integrally formed by the same resin. In addition, a resin for shape transfer (UV transfer/thermal transfer) is applied onto a base film such as PET, and the structure may be subjected to the imprint molding.

Generally, the refractive index of the daylighting portion 42 is a value around 1.5. In the present embodiment, the range from about 1.35 that is a refractive index in as case where a fluorine-based additive is mixed to 1.6 that is a refractive index in a case where a conjugated composition such as an allyl group is mixed is included and each daylighting portion 42 has the refractive index within the above range.

As illustrated in FIG. 6, the daylighting portion 42 is elongated and extended in a straight line shape in one direction (Y direction perpendicular to a sheer surface of FIG. 1) and a cross sectional shape orthogonal to the longitudinal direction forms a polygonal shape. Specifically, the daylighting portion 42 has six apexes (q1 to q6) in the cross-sectional shape and has a hexagonal shape in which all the inner angle is less than 180°. In the plurality of daylighting portions 42, each longitudinal direction is parallel to one side of the rectangular film base material 41, and the daylighting portions 42 are disposed in the vertical direction. The above-described light diffusion layer 3 shows the strong light diffusion properties rather than other direction in each of the extending direction in the plurality of daylighting portions 42.

As illustrated in FIG. 6, a hexagonal shaped first apex q1 and a hexagonal shaped first second apex q2 that are a cross section shape of the daylighting portion 42 are apexes corresponding to the both ends of the first end 32A which is in contact to the film base material 41, a fourth apex q4, a fifth apex q5, and a sixth apex q6 are apexes which are not positioned on the first surface 42A, and a third apex q3 is an apex which are most separated from the first surface 42A. In addition, a length of a vertical line of the first surface 42A passing through the third apex q3 is longer than a length of the vertical line of the first surface 42A passing through the apexes other than the third apex q3 among the plurality of apexes q1 to q6. That is, the shape of the daylighting portion 42 is asymmetrical about the vertical line of the first surface 42A passing through the third apex q3.

The shape of the daylighting portion 42 is not limited the above-described shape, the cross-section orthogonal to the longitudinal direction may be a pentagon, and may be a trapezoid shape or a triangle.

The daylighting layer 4 may be provided on the second substrate 2 such that the longitudinal direction of the daylighting portion 42 is directed to the horizontal plane and the arrangement direction of the plurality of daylighting portions 42 are directed to the vertical direction (Z direction). In addition, the surface thereof is disposed in a state where a surface (air interface 42c) side having a fine structure by the plurality of daylighting portions 42 toward the outdoor side (first substrate 1 side). In a state of after disposing, it becomes a posture in which a hexagonal shaped second surface 42B and a hexagonal shaped third surface 42C that are a cross section shape of the daylighting portion 42 are directed to upward and a fourth surface 42D, a fifth surface 42E, and a sixth surface 42F are directed downward.

It is preferable that the refractive index of the film base material 41 is the same as the refractive index of the daylighting portion 42. The reason is that, for example, in a case where the refractive index of film base material 41 is largely different from the refractive index of the daylighting portion 42, when the light is incident from the daylighting portion 42 to the film base material 41, unnecessary refraction or reflection is generated in an interface between the daylighting portion 42 and the film base material 41. In this case, there is a possibility that the problems are generated such as desired daylighting characteristics cannot be obtained and the brightness is deteriorated.

In the void portion 43, an air is present in the hollow heat-insulating layer 6. Accordingly, the refractive index of the void portion 43 is about 1.0. The refractive index of the void portion 43 set to 1.0. Accordingly, an optimal angle in the interface (air interface) 42C between the daylighting portion 42 and the void portion 43 is minimized.

Hereinafter, an example of a room model in which the daylighting device of the present embodiment will be described.

Figure 7:
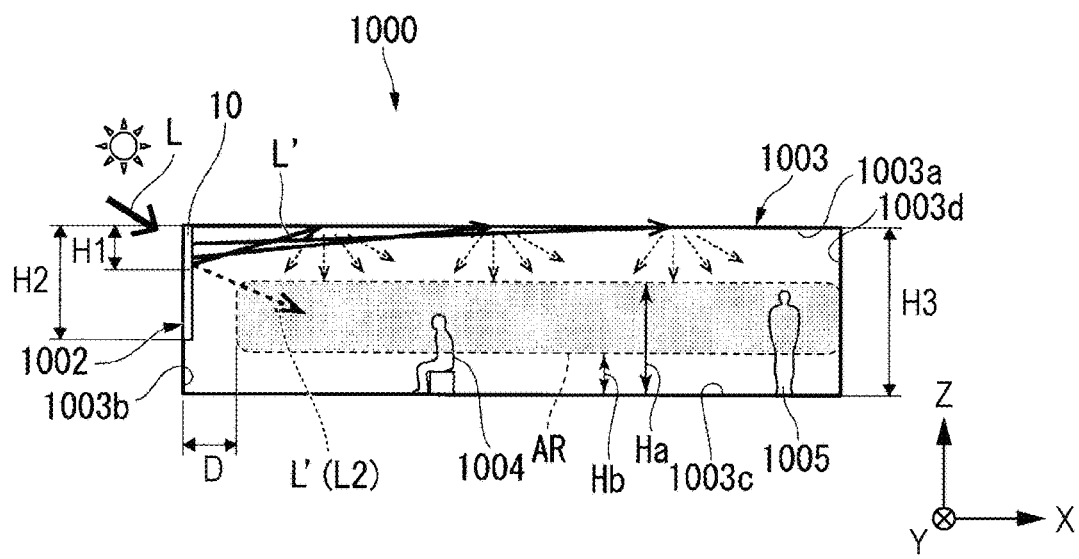
FIG. 7 is a diagram illustrating an example of a room model.

FIG. 7 is a diagram illustrating an example of a room model 1000.

In FIG. 7, a multiple glass window 1002 in which the daylighting device 10 is disposed, a room 1003, a ceiling 1003a, a wall 1003b in a side where the solar light is incident, a floor 1003c, a wall 1003d faxing the wall 1003b, a person 1004 who is in a chair, and a person 1005 who is standing on the floor 1003c are illustrated.

As illustrated in FIG. 7, as the room 1003, the office is included as an example and a shape of the cross-section (XZ cross-section) of the room 1003 is a rectangular shape. A height H3 of the room 1003 (a height from the floor 1003c to the ceiling 1003a) is 2.7 m, for example. A height H2 of the multiple glass window 1002 is 1.8 m, for example. The daylighting device 10 is provided in a portion where the human field is not blocked (a portion of 0.7 m from the ceiling 1003a, for example) in the multiple glass window 1002. The height H1 of the daylighting device 10 is 0.7 m, for example.

In the room model 1000, it is assumed that a person moves in a place which is away from a distance of about 1 m from the wall 1003b, for example. In a region D around the window, it is assumed that there is no person. The region D around the window is 1 m, for example, and it is assumed of a region where the person moves.

In addition, a position of the person's eyes is assumed of 0.8 m to 1.8 m from the floor 1003c, for example.

A height Ha of the eyes of the person 1005 who is standing on the floor 1003c is 1.8 m, for example. A height Hb of the eyes of the person 1004 who is in the chair is 0.8 m, for example. A range of a position of the eyes of the person is assumed based on these heights Ha and Hb of the eyes.

The daylighting device 10 has a function allowing external light L to travel toward the ceiling 1003a. Light L' travelling toward the ceiling 1003a is reflected by the ceiling 1003a and is radiated indoors, and the light is used instead of the illumination. However, in the actual manner, the light L' which has passed through the daylighting device 10 is not only travelling toward the ceiling 1003a but also travelling toward the wall 1003d or the floor 1003c.

In this time, if a case where the daylighting device does not include the light diffusion layer, in the light L' passing through the daylighting device, light L2 toward the position of the eyes of the person who is indoors is present. Such as the light L2, the person in the indoor senses the glare. In the room model 1000, a region where the person in the indoor senses the glare is set to a glare area AR. The range of the glare area AR is defined based on a region where the person moves and the position of the person's eyes. The glare region AR is a region of 0.8 m to 1.8 m from the floor 1003c, for example, in a place which is away from a distance of about 1 m from the wall 1003b, for example.

Next, a definition of an incident angle of light L to be incident to the daylighting device 10 and an emission angle light L' to be emitted from the daylighting device 10 will be described.

Figure 8:
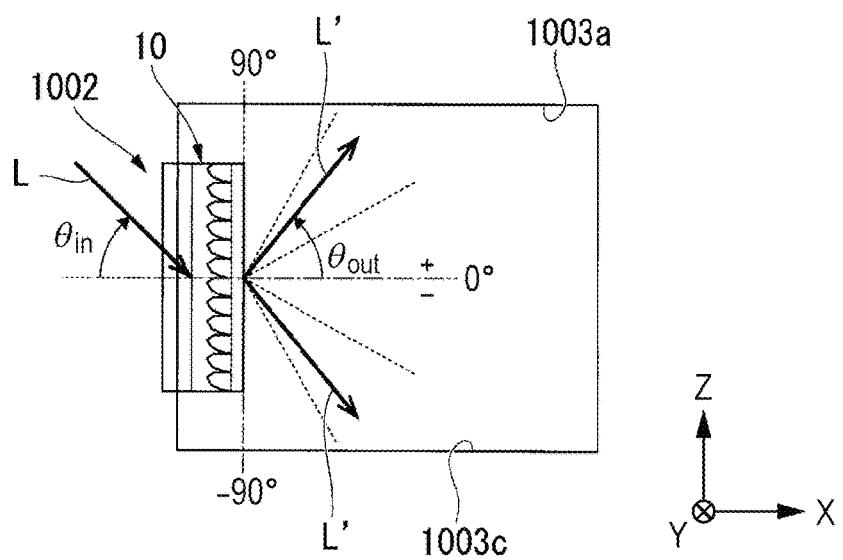
FIG. 8 is an explanatory diagram of an incident angle and an emission angle.

FIG. 8 is an explanatory diagram of an incident angle and an emission angle. In FIG. 8, for the convenience, the multiple layer structure of the daylighting device 10 is simplified. In FIG. 8, an angle formed of a normal direction (X direction) of the daylighting device 10 and light L to be incident to the daylighting device 10 is defined as an incident angle θin and an angle formed of a normal direction and light L' to be emitted from the daylighting device 10 is defined as an emission angle θout. Since the incident light is mainly solar light, the light is mainly incident from obliquely upward of the daylighting device 10. Thus, in the incident angle θin, a normal direction passing through a center (a center of the first substrate 1 and the light diffusion layer 3 in a plane direction) of the daylighting device 10 is defined as 0° and the upper side than the normal direction is defined as a positive (+) angle. That is, the incident angle θin is set to a range of θin≥0° assumed the clockwise angle is positive.

In the emission angle θout, a normal direction passing through a center (a center of an interface between the daylighting portion 42 and the film base material 41) of the daylighting device 10 is defined as 0°, a direction of the ceiling 1003a than the normal direction is defined as a positive (+) angle, and the floor 1003c side than the normal direction is defined as a negative (−) angle. That is, in the emission angle θout, a counter clockwise angle is defined as a positive and a clockwise angle is defined as a negative.

Figure 9:
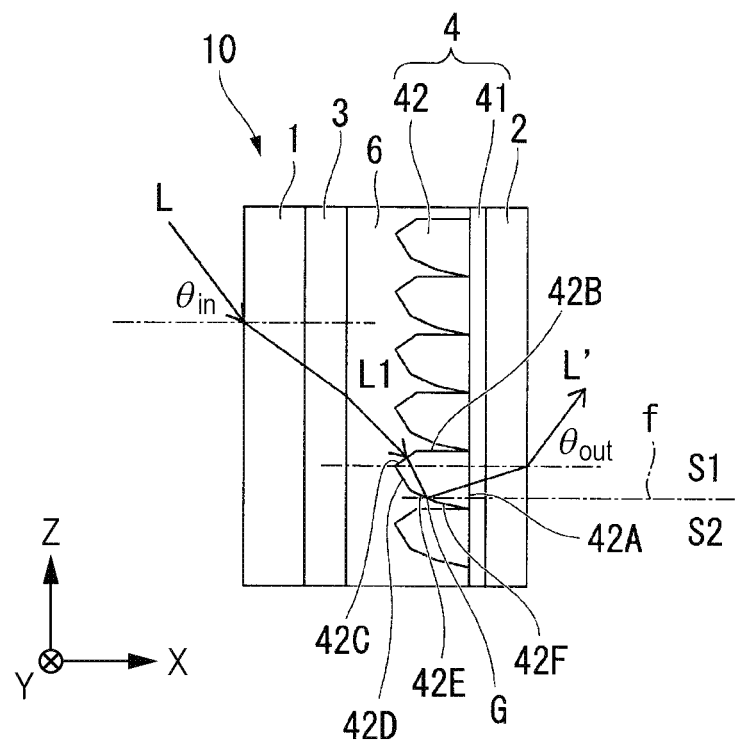
FIG. 9 is a diagram illustrating a light path of light passing through the daylighting device.

Next, an action of the daylighting device 10 including the light diffusion layer 3 and the daylighting layer 4 in the present embodiment. FIG. 9 is a diagram illustrating a light path of the light passing through the daylighting device 10.

Here, for the convenience of the description, a point in which one arbitrary light beam among the light beams which are incident to the daylighting portion 42 as illustrated in FIG. 9 is incident to the fifth surface 42E (reflective surface) of the daylighting portion 42 is defined as an incident point G. A virtual straight line perpendicular to one surface 41a of the film base material 41 is defined as a straight line f. Among the two spaces which use a plane surface including the straight line f as a boundary, a space at a side where the light to be incident to the incident point G is present is defined as a first space S1 and a space at a side where the light to be incident to the incident point is not present is defined as a second space S2.

As illustrated in FIG. 9, the light L which is incident from obliquely upward at incident angle θin≥0° to the daylighting device 10 is refracted in the first substrate 1, is incident to the light diffusion layer 3, and is greatly dispersed to the Y direction (extending direction of daylighting portion 42) in the light diffusion layer 3. Diffused light L1 is guided into the hollow heat-insulating layer 6 and is incident to the daylighting layer 4 from obliquely upward. For example, the diffused light L1 is light L' which is incident to the daylighting portion 42 is refracted in the third surface 42C, proceeds toward the fifth surface 42E side, is reflected in the fifth surface 42E, and then is emitted from the second substrate 2 side to the first space S1 side at emission angle θout≥0°, and proceeds toward the ceiling 1003a of the room 1003 illustrated in FIG. 7.

The above-described light path is an example, the external light which is incident to the daylighting device 10 is incident from any side of the second surface 42B and the third surface 42C of each daylighting portion 42 in the daylighting layer 4, is reflected in any side of the fourth surface 42D, the fifth surface 42E, and the sixth surface 42F, and then is emitted from the first surface 42A side. There are some light paths of the light passing through the daylighting portion 42.

Figure 10A:
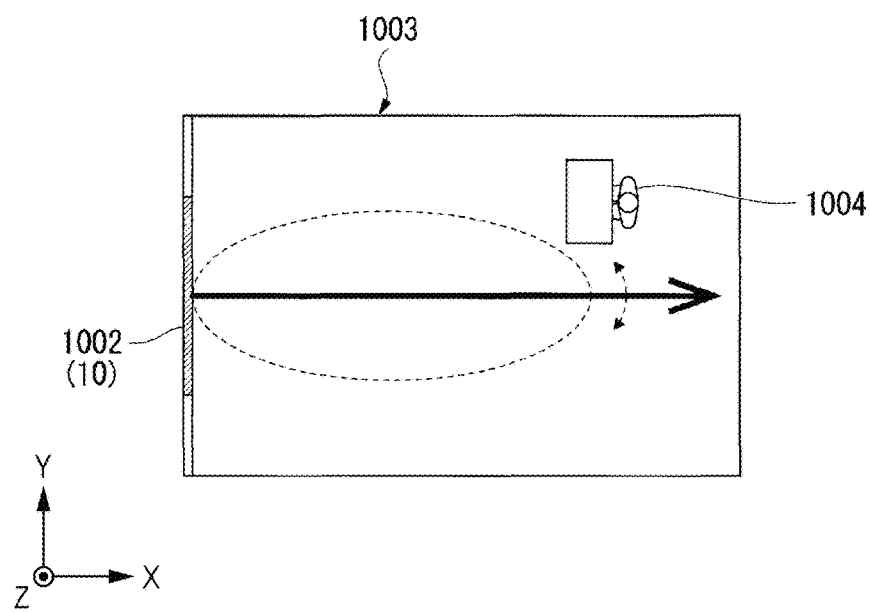
FIG. 10A is a diagram illustrating an emission range of light which has passed through the daylighting device of the embodiment including the light diffusion layers and is a diagram of a room viewed from a ceiling side.
Figure 10B:
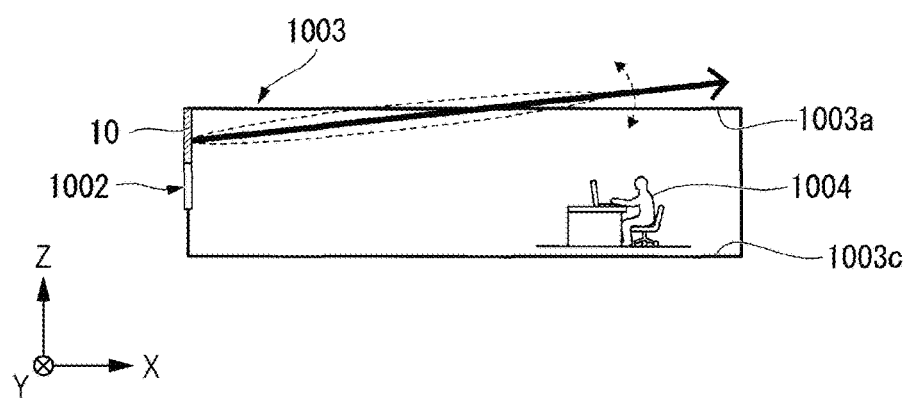
FIG. 10B is a diagram illustrating an emission range of light which has passed through the daylighting device of the embodiment including the light diffusion layers and is a diagram of a room viewed from a side of the room.

FIGS. 10A and 10B are diagrams illustrating an emission range of light which has passed through the daylighting device 10 of the embodiment including the light diffusion layer 3 (not shown) and the daylighting layer 4 (not shown), FIG. 10A is a diagram of a room viewed from a ceiling side, and FIG. 10B is a diagram of a room viewed from a side of the room. In FIGS. 10A and 10B, the room 1003, in which the multiple glass window 1002 including the daylighting device 10 of the present embodiment including the light diffusion layer 3 (not shown) and the daylighting layer 4 (not shown) is disposed, is illustrated.

In FIGS. 10A and 10B, the main emission direction of the light emitted from the daylighting device 10 is indicated by a solid line arrow, and a spreading of the light of the room in the horizontal direction (diffusion range of the emission light) is indicated by a broken line ellipsoid.

As illustrated in FIGS. 10A and 10B, it is preferable that the daylighting device 10 has the light scattering properties which mainly spreads the light to the daylighting device 10 in the horizontal direction (lateral direction) of the room 1003 and do not almost spread the light to the vertical direction (longitudinal direction). That is, as same manner that the light is spread in the horizontal direction, if the light is also spread in the vertical direction, the light toward the ceiling 1003a is dispersed in a direction of the person 1004 in the floor 1003c side, and the brightness to be sense to the eyes of the person 1004 becomes higher, compared to a case of high directional characteristic.

On the other hand, in a case of the light diffusion layer 3 of the lenticular structure, since the light diffusion layer 3 has a configuration in which the light is not dispersed in the vertical direction, there is a possibility that the color breakup phenomenon occurs. Accordingly, when viewing of the daylighting device 10 from indoor side, the person recognizes the daylighting device 10 as a banding pattern.

In the above-described present embodiment, as the light diffusion layer 3, the light diffusion layer 301 (3) having the pseudo-stripe structure (FIG. 4) or the light diffusion layer 302 (3) formed from the particle diffusion film (FIG. 5) in addition to the light diffusion layer having the lenticular structure. The light diffusion layers 301 and 302 have properties for mainly diffusing the light, greatly in the horizontal direction and diffusing the light, slightly in also the vertical direction.

Figure 11A:
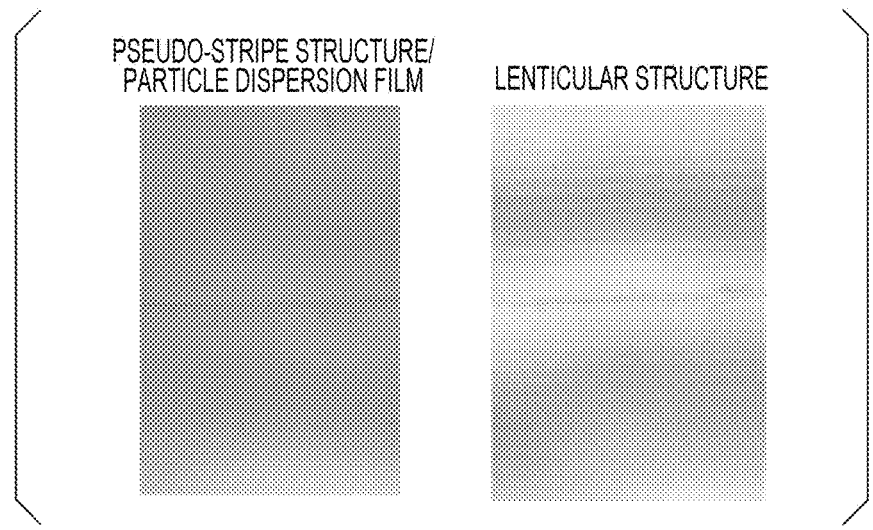
FIG. 11A is a diagram illustrating a light diffusion effect (left side in the drawing) of the light diffusion layer having the pseudo-stripe structure or the light diffusion layer which is formed of a particle diffusion film and a light diffusion effect (right side in the drawing) of the light diffusion layer having a lenticular structure.

FIG. 11A is a diagram illustrating a light diffusion effect (left side in the drawing) of the light diffusion layer having the pseudo-stripe structure or the light diffusion layer which is formed of a particle diffusion film and a light diffusion effect (right side in the drawing) of the light diffusion layer having a lenticular structure.

As illustrated in FIG. 11A, in a case where white light is incident to the daylighting layer having a prism structure, the emission angle is varied little by little for the wavelength due to a wavelength diffusion of the refraction. Therefore, in a case of a device including a daylighting layer having the prism structure and a light diffusion layer having the lenticular structure, as illustrated in the right side of the drawing, horizontal-striped light dispersion (color breakup) occurs in the extending direction (strip direction) of the prism structure.

On the other hand, providing the light diffusion layer to have a configuration (the pseudo-stripe structure and the particle diffusion film structure) which disperse the light, slightly in the vertical direction, as the light diffusion layer having the pseudo-stripe structure illustrated in the left side in the drawing or the light diffusion layer formed from the particle diffusion film, thereby the striped light dispersion can be substantially disappeared.

Figure 11B:
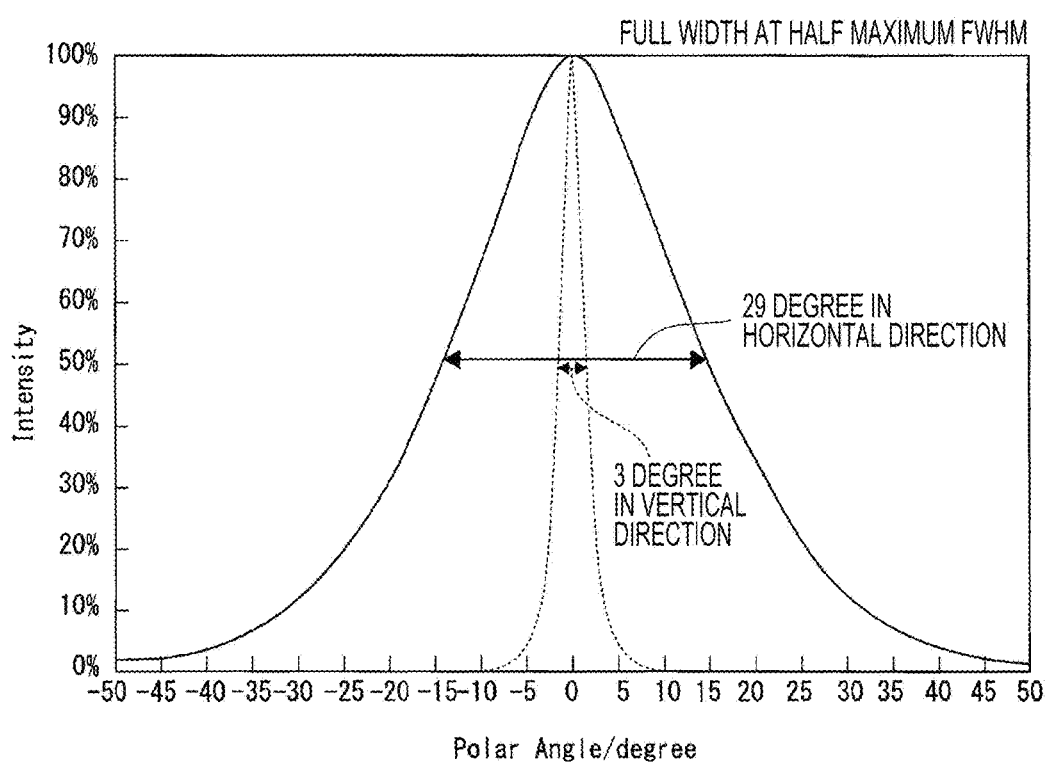
FIG. 11B is a graph illustrating the light diffusion properties of the light diffusion layers having the pseudo-stripe structure and the particle diffusion film structure.

FIG. 11B is a graph illustrating the light diffusion properties of the light diffusion layers having the pseudo-stripe structure and the particle diffusion film structure. Specifically, FIG. 11B is a graph of the light intensity in which the measurement light is radiated from the vertical direction with respect to the light diffusion layer having the pseudo-stripe structure, and the particle diffusion film, and light receiver which is provided on the opposite side moves in a polar angle direction to receive the light, and a normalization peak is set to 100%.

A solid line C illustrated in FIG. 11B indicates the graph in which the light intensity in the horizontal direction is measured.

A broken line illustrated in FIG. 11B indicates a graph in which the light intensity in the vertical direction is measured. In addition, the full width at half maximum of the light diffusion layer 3 in the horizontal direction is about 30°, the full width at half maximum of the light diffusion layer having the particle diffusion film structure is about 30°.

As illustrated in FIG. 11B, as the light diffusion layer 3 to be used in the daylighting device 10 of the present embodiment, the light diffusion layer which has a certain level as the diffusion level which disperses the light in the horizontal direction is preferable and the light diffusion layer 3 having about 15° to 60° of the full width at half maximum is used. When the spreading level of the light in the horizontal direction is smaller than the numerical value, the solar light beam is not tempered, and when the light is entered the line of the sight of the person indoors, since the glare is easily sensed, it is not preferable. On the other hand, in a case where the light is greatly spread in the horizontal direction, since it is a factor of reduction of the optical transparency of the light diffusion layer 3, it is not preferable.

With respect to this, as the diffusion level of the light in the vertical direction, it is preferable to use the product having the weak scattering in which the full width at half maximum is about several degrees to 20° such that directivity of the light toward the ceiling so that it does not so much dropped.

In a case of obtaining the ideal light diffusion properties, the light mainly spread in the horizontal direction, it is desirable of the light diffusion layer 3 having the anisotropic light scattering properties in which the light is not spread too much. In the present embodiment, the light is spread at 17° of the full width at half maximum in the horizontal direction, the full width at half maximum is 5° in the vertical direction, and the light is not diffused in the vertical direction. The full width at half maximum of the measurement light before passing the light diffusion layer 3 is 4°.

With respect to the optical diffusion properties of the light diffusion layer 3 in the present embodiment, the examination is performed in detail. When the light diffusion properties in the vertical direction (polar direction) are too weak as described above, the trouble such as color breakup occurs. However, even when the light diffusion properties is too strong, the light is easily entered to the line of the sight of the person indoors, and it is possibility to cause a problem that the light becomes glare.

Figures 12, 13:
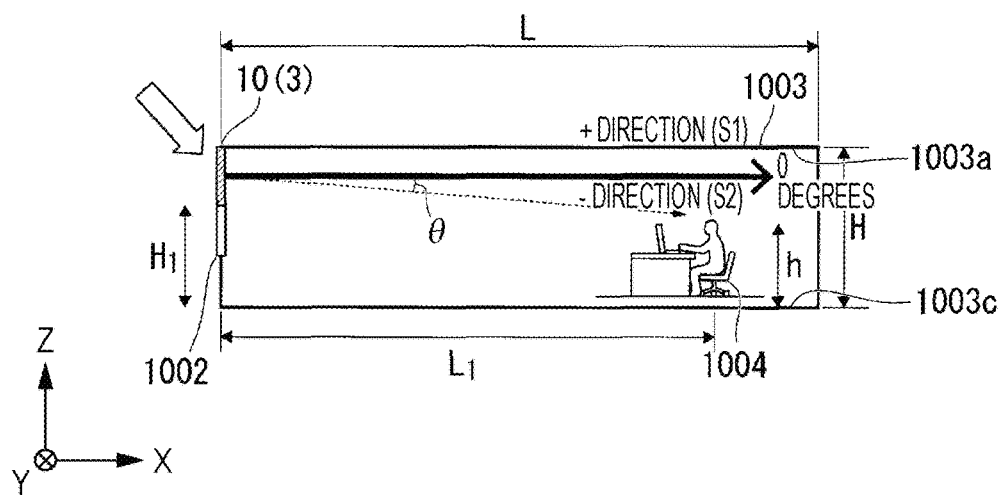
FIG. 12 is a schematic diagram illustrating a room model in which the daylighting device defining the light diffusion properties is disposed.
FIG. 13 is a diagram illustrating the light diffusion properties in 4 types of light diffusion layers to be used for an evaluation in the vertical direction.

As illustrated in FIG. 12, in a case where the diffusion angle θ of the light in the light diffusion layer 3 is defined, from the viewpoint of the glare, in order to cause the person indoors to not sense the glare, it is necessary to avoid that the excessive light diffuses in the floor direction, and it is required to set the light intensity in the diffusion angle θ to the certain level or lower.

Here, it is assumed of a disposing status of the daylighting device 10 as illustrated in FIG. 12. More preferable scope of the invention is defined by defining the light diffusion properties. FIG. 12 is a schematic diagram illustrating a room model in which the daylighting device 10 defining the light diffusion properties is disposed. The size of the room 1003 in a depth direction $L_1$ is 10 m, and a height H from the floor 1003c to the ceiling 1003a is 2.7 m. In a window 1002 which is disposed at the predetermined height from the floor 1003c, the window surface is formed to the ceiling 1003a. The daylighting device 10 is disposed at a position in which a height H1 from the floor 1003c is 2.0 m, and daylighting is performed from this portion. Most of the external light beams lighted from the daylighting device 10 are designed such that the light is directed toward the ceiling direction indoors. However, since the incident angle is varied depending on the seasons or the time, as a worst case in which the glare such that case is considered, it is assumed that the introduced light in the horizontal direction is emitted from the daylighting device 10 by considering a case where it is set that the glare is mostly entered to the eyes.

Here, in the emission direction of the light in FIG. 12, the ceiling direction indoors is defined as + and the floor direction is defined as − as that the horizontal direction set as 0 degrees. In addition, the person 1004 indoors is virtually set in a posture in which the person is seated in a chair which is disposed in a position located about 10 m from the window 1002 toward the direction of the window 1002 and the height h of the line of sight is set to 1.2 m. In this case, an angle θ in which the introduced light which is emitted from the lower end of the daylighting device 10 is entered to the line of sight of the person 1004 indoors is about −5 degrees. When considering such a disposing status, regarding the light diffusion layer 3 of the daylighting device 10, by defining the range of −5 degrees of the light diffusion intensity, more preferable scope of the invention is defined.

On the other hand, from the view point of the color breakup, in order to obscure this, it is required to small light diffusion, and it is required to a certain level of the intensity of the light proceeding at the diffusion angle θ. The light diffusion layer 3 having the various light diffusion properties is disposed to the daylighting device 10, the visual evaluation is performed from the two viewpoints of the glare and the color breakup.

Figure 14:
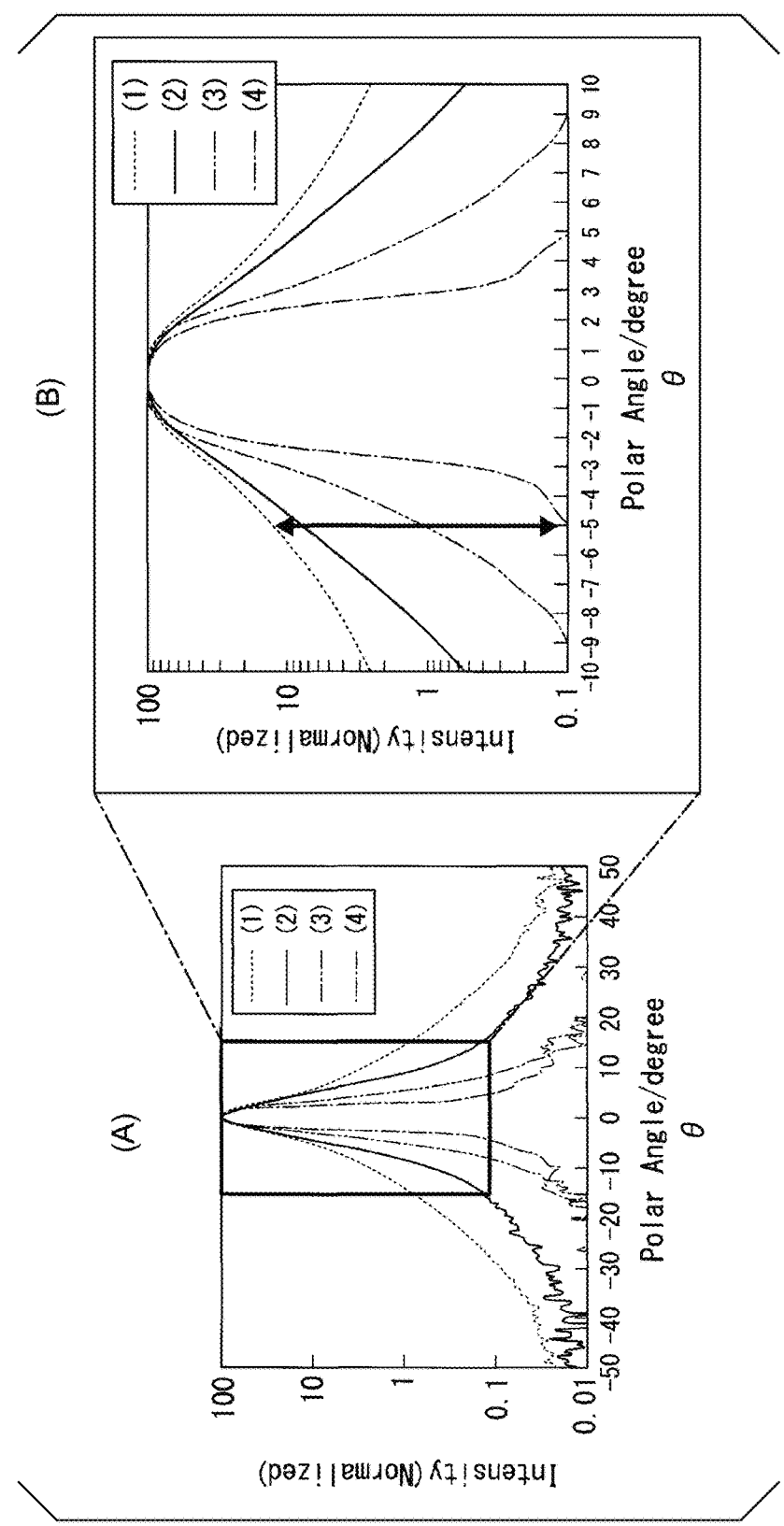
FIG. 14(A) is a graph illustrating the light diffusion properties in 4 types of light diffusion layers to be used for an evaluation in the vertical direction and FIG. 14(B) is an enlarged view illustrating a part of the graph of FIG. 14(A).

The light diffusion properties in 4 types of light diffusion layers to be used for an evaluation in a vertical direction are illustrated in FIGS. 13, 14(A), and 14(B). FIG. 14(B) is an enlarged view illustrating a part of the graph of FIG. 14(A).

The width is provided to the light diffusion properties in each light diffusion layer, and four types from a light diffusion layer (1) having a large diffusion width to a light diffusion layer (4) having a small diffusion width is examined. The four types of the light diffusion layers shows the weak light diffusion properties in which the full width at half maximum is within 5 degrees. In here, the transmittance of the daylighting device 10 in the front surface (0 degrees) direction is normalized as 100 and relative value with respect to this is shown. Since the light diffusion properties are weak, in FIG. 14(A), the vertical axis that is the diffusion intensity is a logarithmic display. In FIG. 14(B), the main portion of the graph of FIG. 14(A) is enlarged.

The four types of the light diffusion layers can be used as the light diffusion layer 3 of the present embodiment, and the glare and the color breakup are evaluated by correlation with the light diffusion properties. In the intensities of the light diffusion at a polar angle 5 degrees (−5 degrees) in the floor direction, the intensity of the light diffusion layer (1) is 12.1%, the intensity of the light diffusion layer (2) is 7.5%, the intensity of the light diffusion layer (3) is 1.0%, and the intensity of the light diffusion layer (4) is 0.09%, respectively. As an evaluation result of the glare in a case where the light diffusion layer is disposed on the daylighting device 10 under the environment as described in the previous page, since in the light diffusion layer (2), the light diffusion layer (3), and the light diffusion layer (4), there is no problem that there is no person sensed as glare, it is evaluated as A. However, regarding the light diffusion layer (1), there is a person sensing the glare, it is evaluated as B. From the result, from the viewpoint of the glare, it is found that it is likely to be the border of the "glare" or "not glare" at a position of about 10% as the light diffusion intensity in which the diffusion angle θ of the light that is the light proceeding to the second space region S2 side is −5 degree direction.

As a more preferable range of the present embodiment, it can be considered that it is preferable that the light diffusion intensity at the polar angle 5 degrees (−5 degrees) in the floor direction is 10% or less of the intensity of the light proceeding in the front (0 degrees) direction of the daylighting device 10.

In the same manner, it is evaluated whether the color breakup with respect to the above-described four types of the light diffusion layers can be confirmed. As a result, relating to the light diffusion layer (1), the light diffusion layer (2), and the light diffusion layer (3), the color breakup is disappeared and the color breakup cannot be confirmed. However, relating to the light diffusion layer (4), there is a small color breakup. From this result, from the viewpoint of the color breakup, it is found that it is likely to be the border of the color breakup "cannot be confirmed" or "can be confirmed" at a position of about 0.1% as the light diffusion intensity of −5 degree direction. As a more preferable range of the present invention, it can be considered that it is preferable that the light diffusion intensity at the polar angle 5 degrees (−5 degrees) in the floor direction is 0.1% or more of the intensity of the light proceeding in the front (0 degrees) direction of the daylighting device 10.

From the above results, as a more preferable range of the present embodiment, it can be considered that it is preferable that the light diffusion intensity at the polar angle 5 degrees (−5 degrees) in the floor direction is in a rage of 0.1% to 10% of the intensity of the light proceeding in the front (0 degrees) direction of the daylighting device 10.

Next, the optical characteristics of the daylighting device 10 in the present embodiment will be described in detail with an example mainly as an effect that the light diffusion layer 3 is disposed in the light incident side of the daylighting layer 4.

1. "A Case of Focusing on Fact that Light Diffusion Layer Includes Diffusion Components in Z Direction (Vertical Direction)"

Here, with respect to the light diffusion layer having the particle diffusion film including the light diffusion particles and the pseudo-stripe structure, it is considered a case where the incident angle θin of the solar light is 30°.

Figure 15:
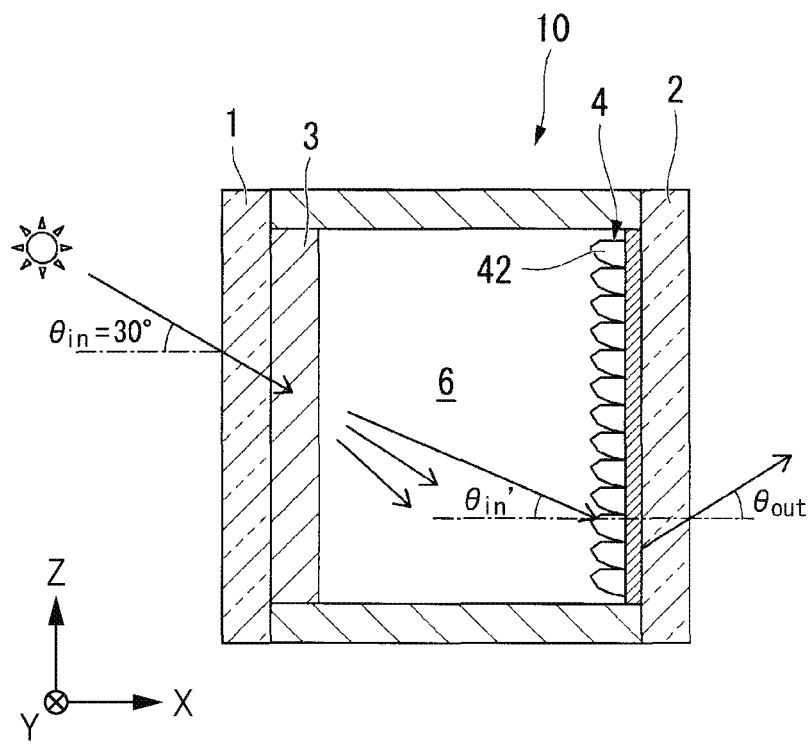
FIG. 15 is a diagram specifically illustrating a light path of light passing through the daylighting device in a case where an incident angle θin of incident light is 30°.

FIG. 15 is a diagram specifically illustrating a light path of light passing through the daylighting device 10 in a case where an incident angle θin of incident light is 30°.

First, in a case where the solar light is directly incident to the daylighting layer 4, the sun can be considered as an extremely high point light source, and it is considered that the solar light is incident to the daylighting layer 4 at a single incident angle θin.

With respect to this, in the daylighting device 10 of the present embodiment, the solar light is firstly incident to the light diffusion layer 3. As described above, the light diffusion layer 3 can specifically diffuse the light incident to the light diffusion layer 3 in the Y direction and can emit the diffused light. Most of the light beams diffused in the light diffusion layer 3 are greatly diffused in the Y direction. However, a small light to be slightly diffused in also Z direction (vertical direction) is present. In this time, the light diffused in the Z direction is converted into an incident angle θin' having the angle distribution from the original single incident angle θin to the Z direction.

For example, after passing through the light diffusion layer 3, if ±5° of the angle distribution is attributed to the incident angle θin, the diffused light having a width of 30°±5° becomes incident angle θin' to be incident to the daylighting layer 4.

Figure 16:
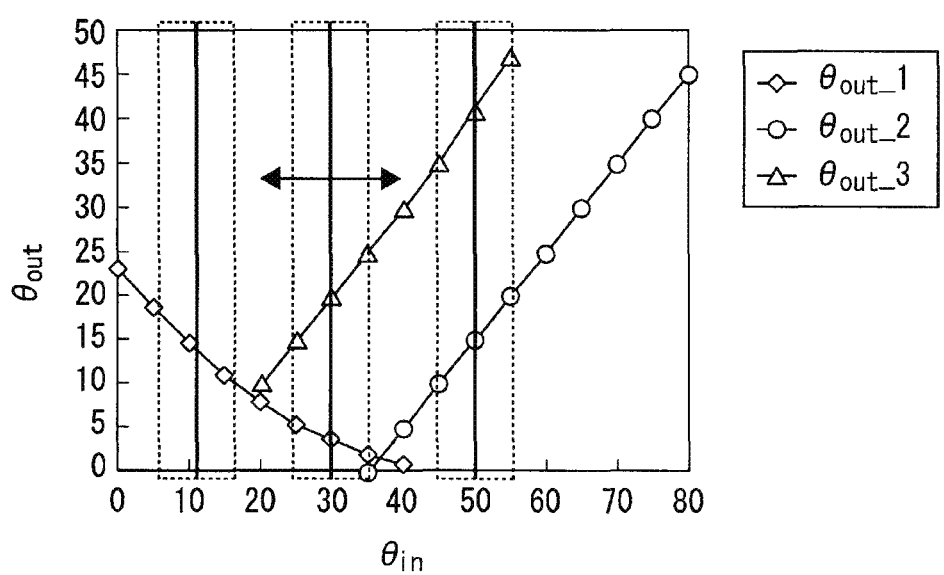
FIG. 16 is a diagram illustrating daylighting properties of the daylighting device.

FIG. 16 is a diagram illustrating daylighting properties of the daylighting device. In the drawing, a horizontal axis indicates an incident angle θin of the external light to be incident to the daylighting device and the vertical axis indicates an emission angle θout of the light (main light beam) to be emitted from the daylighting device. θout1, θout2, and θout3 indicate the relationship between the incident angle and the emission angle of the transmission light in which the daylighting layer 4 is passing through the difference light path.

If the width is contributed to the incident angle θin/of the diffused light to be incident to the daylighting layer 4, the width is contributed in the emission angle θout. By disposing the light diffusion layer 3 which slightly diffuses the light in also Z direction (vertical direction) to the light incident side (outdoor side) of the daylighting layer 4, the emission light having the various angle distributions can be obtained. If ±5° of angle distribution is provided in the incident angle θin, the altitude of the sun (incident angle θin) is in the more wider range of 11° to 50°, low angle emission component (0°≤θout≤10°) is included, in which the emission angle θout in the emission light is 10° or less, it is possible to bright the back of the room.

A fact that the emission angle θout from the daylighting device 10 is a certain degrees or more is different depending on the usage state or a form of the daylighting device 10.

Since the daylighting device 10 of the present embodiment is disposed at the upper portion of the multiple glass window 1002, as illustrated in FIG. 8, for example, the emission light may include an angle component of emission angle θout=0°.

In addition, by mixing the various types of the emission angle components, it is possible to relieve the temporal dependence or the season dependence of the daylighting state by the solar altitude. Accordingly, the stabilized light environment can be obtained. This is a specific effect to be obtained in a case where the light diffusion layer 3 for diffusing the light in the Z direction (vertical direction) is disposed in the light incident side (outdoor side) of the daylighting layer 4.

2. "A Case of Focusing on Fact that Light Diffusion Layer Includes Diffusion Components in Y Direction (Extending Direction of Daylighting Portion 42)"

Figure 17:
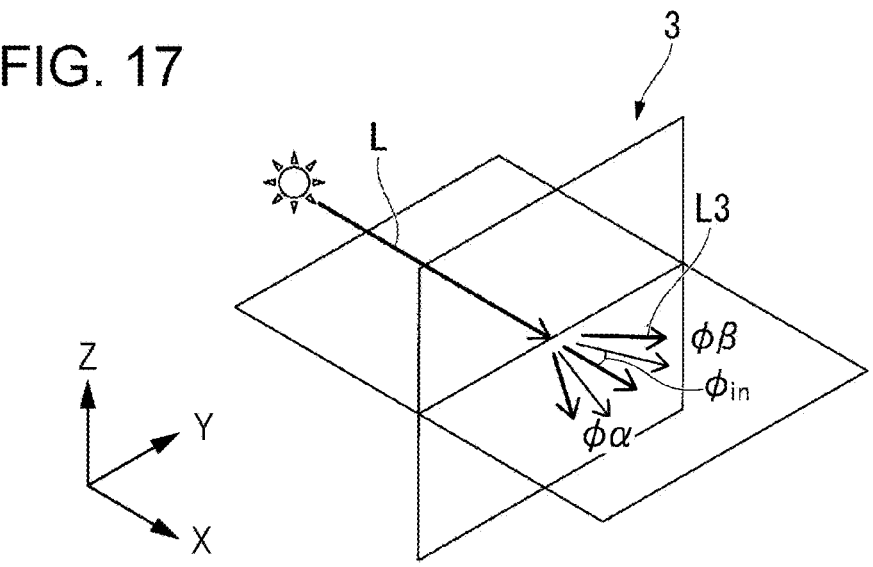
FIG. 17 is a diagram illustrating optical characteristics (diffusion properties) of the light diffusion layer.
Figure 18A:
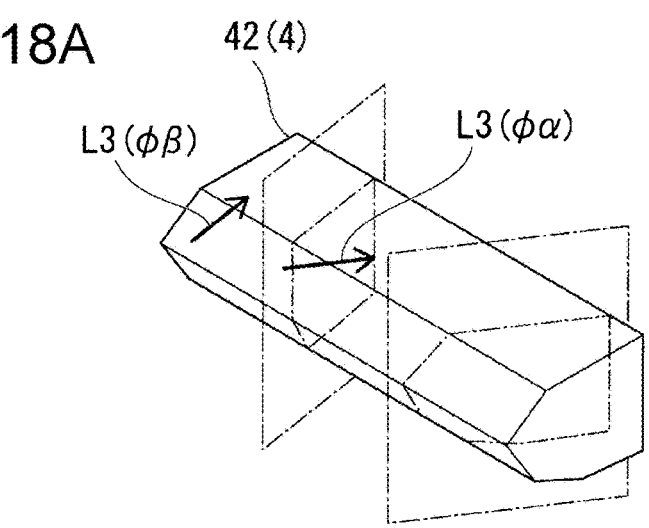
FIG. 18A is a perspective view illustrating a state where the diffused light is incident to the daylighting portion of the daylighting layer.
Figure 18B:
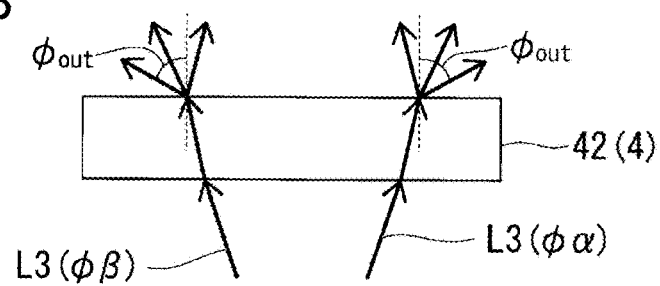
FIG. 18B is a plan view illustrating a state where the diffused light is incident to the daylighting portion of the daylighting layer.

FIG. 17 is a diagram illustrating optical characteristics (light diffusion properties) of the light diffusion layer. FIGS. 18A and 18B are diagrams illustrating a state where the diffused light is incident to the daylighting portion of the daylighting layer, FIG. 18A is a perspective view, and FIG. 18B is a plan view.

As illustrated in FIG. 17, the light diffusion layer 3 in the present embodiment has characteristics of specifically diffusing the light in Y direction (horizontal direction of the window glass). The light diffusion layer 3 greatly diffuses the light in a direction perpendicular to the optical axis of the incident light to emit the diffused light. The external light L which is incident to the light diffusion layer 3 maintains the incident angle to the Z direction (vertical direction) and is converted into the diffused light L3 having various angle components ($\Phi\alpha$, $\Phi\beta$) in the Y direction perpendicular to the incident light axis. Here, $\Phi$ is an angle in the horizontal plane orthogonal to the light diffusion layer 3.

The diffused light L3 is light indicating the angle distribution having ± several degrees to the Y direction orthogonal to the incident light axis, in which the light travelling in a straight line along the incident light axis. When the angle formed of the optical axis of the incident light L and the diffused light L3 is set as the diffusion angle $\Phi$, the incident angle of the diffused light L3 to be incident to the daylighting layer 4 is indicated by $\Phi$in. That is, $\Phi$ is an angle in a plane orthogonal to the light diffusion layer 3.

If the angle components to be incident to the daylighting portion 42 of the daylighting layer 4 are variety, the light passes through the portion including the various different cross-sections in the daylighting portion 42, according to the incident angle ($\Phi$in of the diffused light L3.

For example, as illustrated in FIGS. 18A and 18B, even in a case where the light from a specific orientation facing the daylighting layer 4 is incident, in addition to that the incident light beam is allowed to transmit the cross-section α of the daylighting portion 42, by allowing the light to transmit to the portion having cross-section areas such as allowing the light to transmit the cross-section β, the various light beams emitted from the daylighting portion 42 at an emission angle $\Phi$out to the extending direction of the daylighting portion 42 are increased. That is, the light beam $\Phi\alpha$ and the light beam $\Phi\beta$ of the diffused light L3 are emitted from the daylighting layer 4 at different emission angles $\Phi$out. Accordingly, it is possible to bright the room in a wide range in the horizontal direction (the extending direction of the daylighting portion 42).

Accordingly, by disposing the light diffusion layer 3 for specifically diffusing the light of the room in the horizontal direction than the daylighting layer 4, the width is applied to the emission angle θout.

In addition, by mixing the various types of the emission angle components to the room in the horizontal direction (Y direction), it is possible to relieve the temporal dependence or the season dependence of the daylighting state by the solar altitude. Accordingly, the stabilized light environment can be obtained. This is a specific effect to be obtained in a case where the light diffusion layer 3 for diffusing the light in the vertical direction is disposed in the light incident side (outdoor side) of the daylighting layer 4. Accordingly, by radiating the diffused light to the daylighting portion 42, a function such as a various types of the cross-sectional daylighting portion 42 are provided is included.

As described above, the daylighting device 10 of the present embodiment includes the light diffusion layer 3 and the daylighting layer 4 between the first substrate 1 and the second substrate 2. Therefore, when the external light mainly including a lot of the solar light beams is incident to the daylighting device 10, the light is diffused to the Y direction by the light diffusion layer 3 which is disposed on the first substrate 1 (light incident side of the daylighting layer 4), and the light in the daylighting layer 4 is emitted toward the ceiling 1003a of the room 1003.

Therefore, the brightness of the emission light in the Y direction are substantially uniform.

Therefore, even when the solar light from the oblique horizontal direction without upward in the front surface of the multiple glass window 1002, it is not a part (corner) of the room 1003 (ceiling 1003a) is particularly bright, and entire the room 1003 (ceiling 1003a) including the center portion in the horizontal direction are bright. Therefore, specifically, luminance unevenness due to a change in the incident angle of the solar light is relieved, it is possible to bright the ceiling 1003a entirely.

In addition, according to the daylighting device 10 of the present embodiment, the light incident from the daylighting device 10 of the multiple glass window 1002 is spread to the room 1003 in the horizontal direction, thereby it is possible to bright the entire the room over the end from the end of the room 1003 even when the size of the multiple glass window 1002 is small.

In addition, the present embodiment can allow the light L incident to the room 1003 through the daylighting device 10 to toward the ceiling 1003a with good efficiency. In the present embodiment, among the light beams L' which is incident to the room 1003 passing through the multiple glass window 1002 including daylighting device 10, the brightness of light toward the ceiling 1003a can be relatively increased while reducing the brightness of the light L2 toward a glare region G or the light toward the floor 1003c.

Accordingly, it allows persons 1004 and 1006 in the room 1003 to not sense the glare by suppressing the glare light and the bright environment of the room 1003 can be maintained by fully using indoors natural light (solar light). In addition, it is possible to bright the back of the room 1003 regardless of a change in the incident angle in associated with a change in the seasons of the solar light.

As described above, in the present embodiment, by including not only the daylighting layer 4 but also the light diffusion layer 3 inner portion of the multiple glass structure, a daylighting device which maintains insulating properties and which is capable of obtaining a stabilized bright light environment without being affected by the incident direction of the solar light.

In addition, by disposing the light diffusion layer 3 and the daylighting layer 4 to the inner side of the multiple glass, an effect that the light diffusion layer 3 and the daylighting layer 4 can be protected and the cleaning work becomes easier. Accordingly, each of the optical characteristics can be maintained for a long period of time.

The daylighting device 10 in the present invention is not limited to a device configuring a part of the multiple glass window 1002. Entire the multiple glass window 1002 may be configured by the daylighting device 10. In addition, the daylighting layer 4 and the light diffusion layer 3 may have a size facing at least one portion of the first substrate 1 and the second substrate 2.

Second Embodiment

Next, a daylighting device according to second embodiment will be described.

A basic configuration of a daylighting device 20 of the present embodiment to be described below is the same as that of the first embodiment above and is different from the first embodiment in that a UV protecting film 7 and the plurality of light diffusion layers 3 are included.

Therefore, in the following description, the difference feature of the configuration will be described in detail and the description of common portions as the first embodiment above will not be described. In addition, in each drawing to be used in the description, the same reference numerals are allocated to the common configuration elements of FIGS. 1 to 9.

Figure 19:
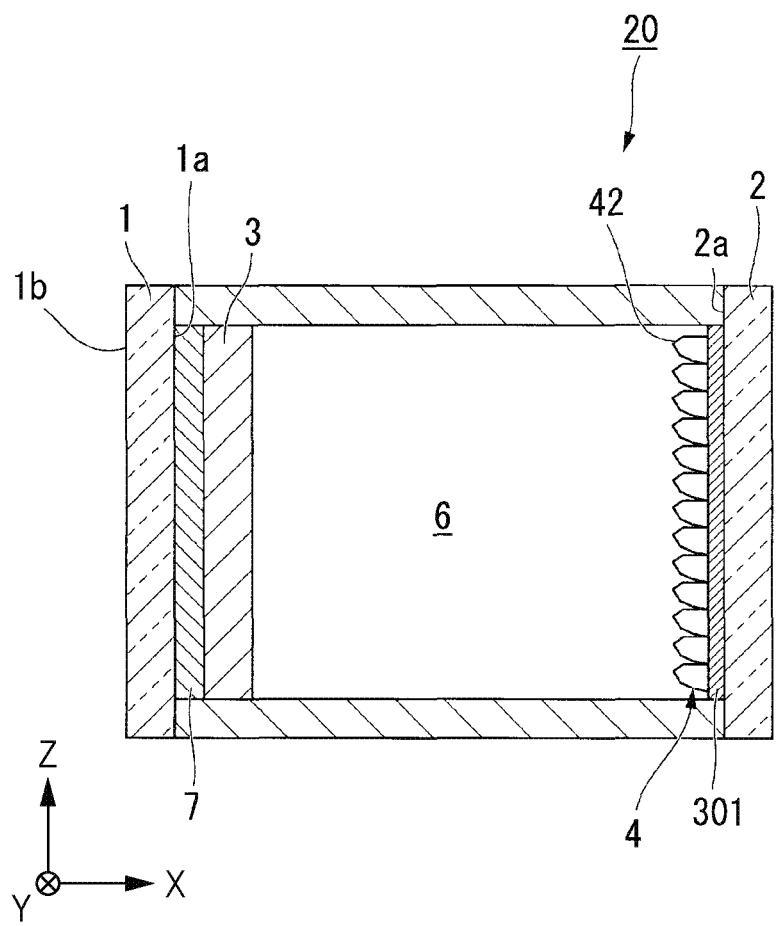
FIG. 19 is a cross-sectional view illustrating a schematic configuration of a daylighting device of a second embodiment.

FIG. 19 is a cross-sectional view illustrating a schematic configuration of a daylighting device of a second embodiment.

As illustrated in FIG. 19, in the daylighting device 20 of the present embodiment, the light diffusion layer (first light diffusion layer) 3 is provided on the first substrate 1 and the light diffusion layer (second light diffusion layer) 301 is provided on the second substrate 2. The light diffusion layer 301 which is provided at the second substrate 2 side shows the weak light diffusion properties than that of the light diffusion layer 3 which is provided at the first substrate 1 side. The light diffusion layer 301 is provided on an inner surface 2a of the second substrate 2 and is disposed between the daylighting layer 4 and the second substrate 2. The light diffusion layer 301 can be formed by the particles dispersed film which is described above.

The light scattering properties of the light diffusion layer 301 may have anisotropy.

The daylighting device 20 of the present embodiment further includes a UV protecting film (ultraviolet protecting layer) 7. The UV protecting film 7 is provided on the inner surface 1a of the first substrate 1 positioned on the outdoor side, and is disposed between the first substrate 1 and the light diffusion layer 3.

The UV protecting film 7 filters out an ultraviolet ray considerably and is a film to allow the visible light to pass.

Since the daylighting layer 4 is one type of the prism sheet, the daylighting layer 4 reflects indoors light. Therefore, when the person indoors looks the window, the reflected light is entered to the eyes, and the person senses the glare. With respect to this, according to the configuration of the present embodiment, by the light diffusion layer 301 which is disposed in the light emission side (indoor side) of the daylighting layer 4, the glare when viewed from the indoor side can be suppressed.

In addition, since the daylighting device 20 of the present embodiment includes the UV protecting film 7 on the inner surface 1a of the outdoor side first substrate 1 in which a lot of the external light beams are illuminated, the deterioration in the light diffusion layer 3 and the daylighting layer 4 due to the ultraviolet rays can be suppressed. Therefore, the daylighting device 20 can be used for a long period of time without maintenance of the daylighting device 20. In addition, burning (fading) of the furniture or the wall material indoors is suppressed.

Figure 20:
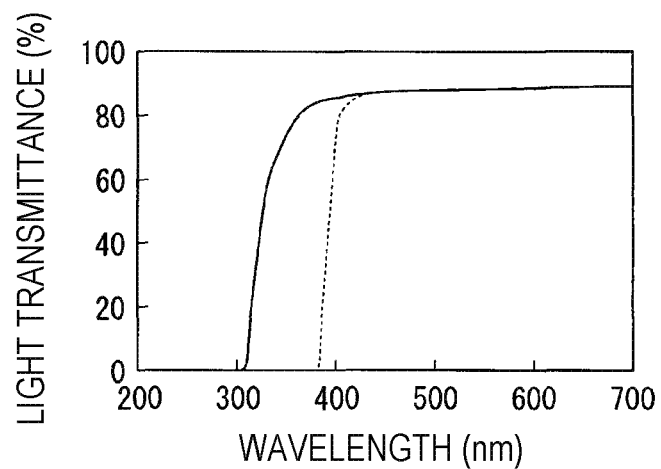
FIG. 20 is a graph illustrating a optical transparency of a PET film in which a UV protection measure is subjected and a optical transparency in the PET film in which the UV protection measure is not subjected.

FIG. 20 is a graph illustrating a optical transparency of a PET film in which a UV protection measure is subjected (a graph indicated by a broken line) and a optical transparency in the PET film in which the UV protection measure is not subjected (a graph indicated by a solid line). A horizontal axis of a graph in the drawing represents a wavelength (nm) and a vertical axis represents an optical transparency (%).

As the UV protecting film 7 to be used in the daylighting device 20 of the present embodiment, an UV absorber which is capable of absorbing the light having a wavelength between 300 nm to 380 nm may be mixed to the PET film. As a result of that the UV absorber is mixed to the PET film, the transmission spectrum of the UV protecting film is the characteristics as illustrated in the graph of the broken line of FIG. 20.

The PET film in which the UV absorber is mixed is adopted as the UV protecting film 7 in the present embodiment, by disposing the UV protecting film 7 to the outdoor side than the light diffusion layer 3 that is the optical incident side of the daylighting layer 4, the daylighting device 20 in which the deterioration (color changing or the like) in the light diffusion layer 3 and the daylighting layer 4 and can be resisted for a long period of time can be obtained.

The UV protecting film 7 may be provided on an outer surface 1b of the first substrate 1.

Third Embodiment

Next, a daylighting device of third embodiment will be described.

A basic configuration of a daylighting device 30 of the present embodiment to be described below is the same as that of the first embodiment above and is different from the first embodiment in that the daylighting layer 4 and the light diffusion layer 3 are disposed on the second substrate 2 side. Therefore, in the following description, the difference feature of the configuration will be described in detail and the description of common portions as the first embodiment above will not be described. In addition, in each drawing to be used in the description, the same reference numerals are allocated to the common configuration elements of FIGS. 1 to 9.

Figure 21:
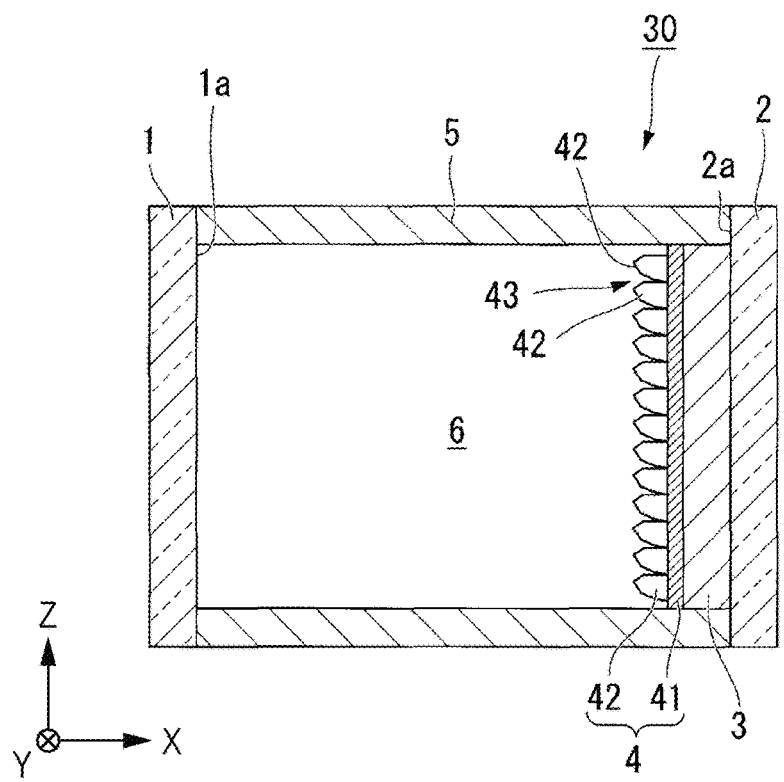
FIG. 21 is a cross-sectional view illustrating a schematic configuration of a daylighting device of a third embodiment.

FIG. 21 is a cross-sectional view illustrating a schematic configuration of a daylighting device of a third embodiment.

As illustrated in FIG. 21, in the daylighting device 30 of the present embodiment, the light diffusion layer 3 and the daylighting layer 4 are provided on the second substrate 2. The light diffusion layer 3 and the daylighting layer 4 are laminated on the second substrate 2 in order from the inner surface 2a. In the present embodiment, the configuration in which the light diffusion layer 3 is disposed on the light emission side of the daylighting layer 4.

Next, optical characteristics of the daylighting device 30 in the present embodiment will be described.

Figure 22:
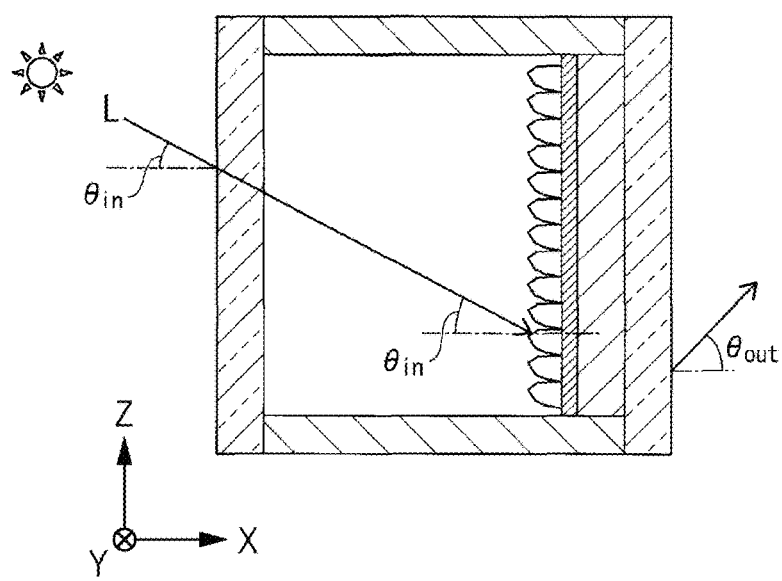
FIG. 22 is a diagram illustrating optical characteristics of the daylighting device of the third embodiment.

FIG. 22 is a diagram illustrating the optical characteristics of the daylighting device of a third embodiment.

Here, an effect in a case where the light diffusion layer 3 is disposed at the light emission side of the daylighting layer 4 will be described.

As illustrated in FIG. 22, the light which is incident from obliquely upward to the daylighting device 30 at a predetermined incident angle θin proceeds to the hollow heat-insulating layer 6 through the first substrate 1 and is incident to the daylighting layer 4 at a single incident angle θin. The daylighting layer 4 outputs the light which is incident at the incident angle θin at the emission angle θout. The emission angle of the light beam which is incident to the daylighting layer 4 is determined by the simple geometric optics (daylighting portion 42).

The light diffusion layer 3 holds the emission angle θout of the light emitted from the daylighting layer 4 and specifically diffuses the light in the Y direction (extending direction of the daylighting portion 42) orthogonal to the optical axis around the optical axis of the incident light beams.

Therefore, by designing the optical characteristic (the cross-sectional shape of each daylighting portion 42) of the daylighting layer 4 by an optical simulation in advance, the emission angle θout and the emission direction of the light to be emitted from the daylighting device 30 can be obtained with good efficiency. The design of the daylighting layer 4 is carried out based on the angle of the light beam to be incident to the daylighting device 30 (altitude of the sun), a status of a direction of the window in which the daylighting device 30 is disposed, the size of the room, or the like.

Figure 23:
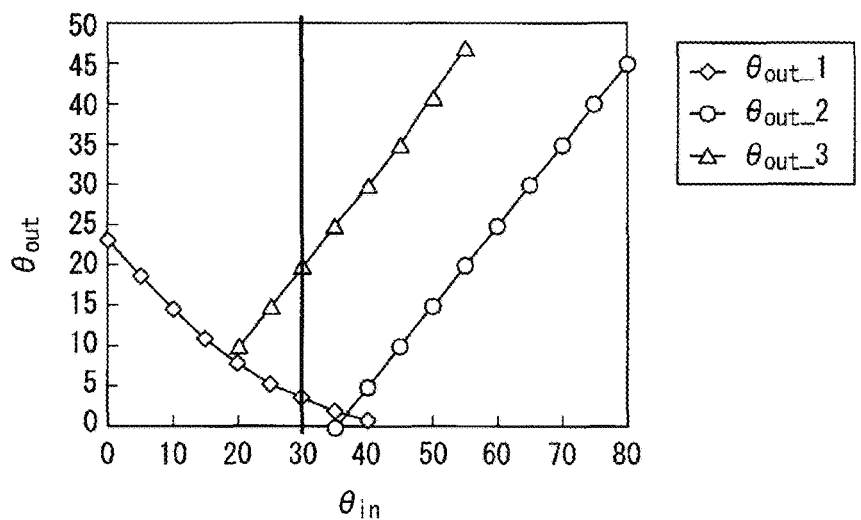
FIG. 23 is a diagram that geometric optics in the daylighting layer is schematically illustrated on a graph.

FIG. 23 is a diagram that geometric optics in the daylighting layer is schematically illustrated on a graph. In the drawing, a horizontal axis indicates an incident angle θin of the light to be incident to the daylighting device and the vertical axis indicates an emission angle θout of the light to be emitted from the daylighting device. In the drawing, θout_1, θout_2, and θout_3 show the characteristics of the light beams passing through the difference light path in one daylighting portion 42.

As illustrated in FIG. 23, in a case where the incident angle θin of the incident light to be incident to the daylighting layer 4 is 30°, in the emission light emitted from the daylighting layer 4, low angle component light in which the emission angle θout is 4° and high angle component light in which the emission angle θout is 20°.

The light diffusion layer 3 holds the angle (emission angle θout) in the vertical direction of the incident light (light emitted from the daylighting layer 4) and diffuses the light in the Y direction orthogonal to the optical axis around the optical axis of the incident light beams.

In this manner, even in a case where the light diffusion layer 3 is disposed in the light emission side of the daylighting layer 4, the light environment as designed can be obtained. Since the effect in a case where the light diffusion layer 3 is disposed in the light emission side of the daylighting layer 4 can be predicted in advance, there is an advantage that it is easily used to the illumination design of the building.

The advantage is a specific effect which is obtained in a case where the light diffusion layer 3 is disposed to the indoor side than the daylighting layer 4.

Fourth Embodiment

Next, a daylighting device of fourth embodiment will be described.

A basic configuration of a daylighting device 40 of the present embodiment to be described below is the same as that of first embodiment above and is different from the first embodiment in that a third substrate 8 is included. Therefore, in the following description, the difference feature of the configuration will be described in detail and the description of common portions as the first embodiment above will not be described. In addition, in each drawing to be used in the description, the same reference numerals are allocated to the common configuration elements of FIGS. 1 to 9.

Figure 24:
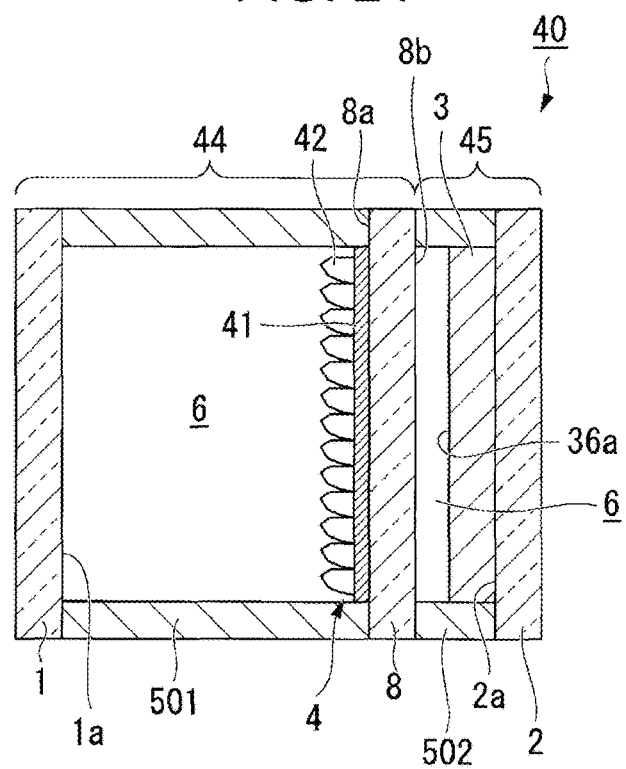
FIG. 24 is a cross-sectional view illustrating a configuration of a daylighting device in a fourth embodiment.

FIG. 24 is a cross-sectional view illustrating a configuration of a daylighting device in a fourth embodiment.

Figure 25:
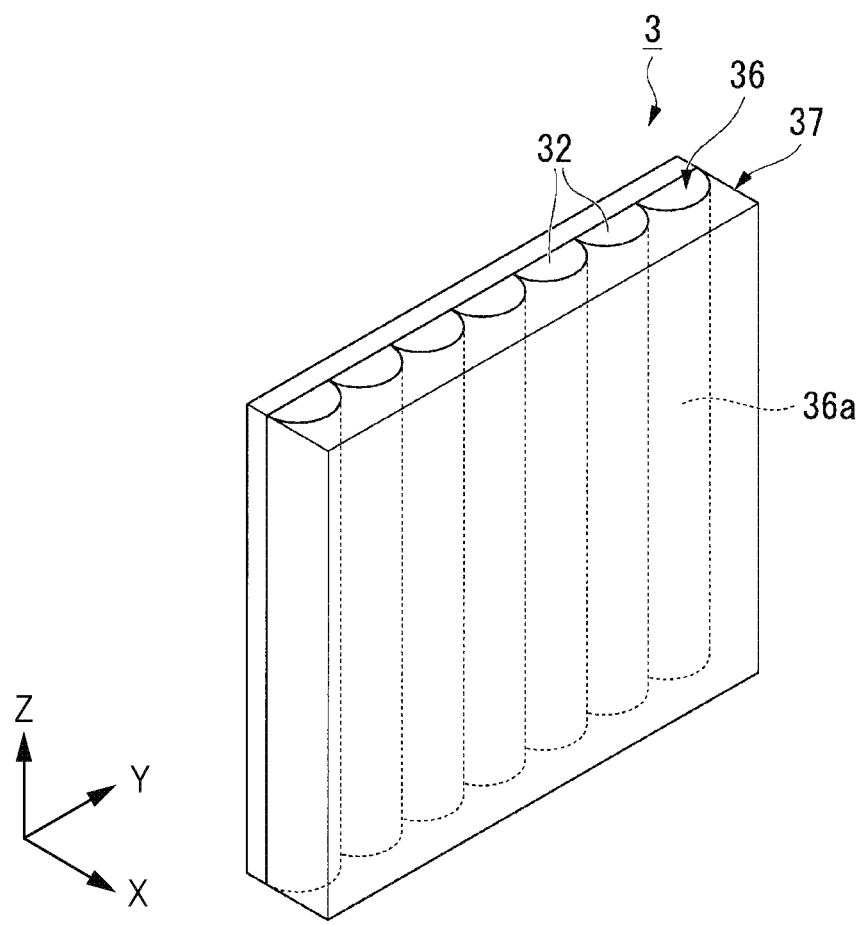
FIG. 25 is a perspective view illustrating a configuration of the light diffusion layer in the fourth embodiment.

FIG. 25 is a perspective view illustrating a configuration of the light diffusion layer in the fourth embodiment.

As illustrated in FIG. 24, the daylighting device 40 of the present embodiment is configured by including the third substrate 8 between the first substrate 1 and the second substrate 2. The third substrate 8 is disposed at a predetermined distance from the first substrate 1 and the second substrate 2. In here, the third substrate 8 is disposed in a position near the second substrate 2.

In the daylighting layer 4, the film base material 41 side is adhered to a first surface 8a of the third substrate 8 in a state where the daylighting portion 42 side is toward the first substrate 1.

The light diffusion layer 3 is provided in the inner surface 2a of the second substrate 2. The light diffusion layer 3 is adhered to the second substrate 2 using a not-illustrated adhesive and is integrally formed with the second substrate 2.

As illustrated in FIG. 25, the light diffusion layer 3 is configured of the lenticular lens structure 36 including the plurality of convex lens portions 32 and a planarizing layer 37 for planarizing the lens surface 36a that is a surface of the lenticular lens structure 36. The planarizing layer 37 and the second substrate 2 are adhered to each other in a state where the planarizing layer 37 side is toward the second substrate 2.

The lens surface 36a of the lenticular lens structure 36 in the present embodiment (a surface facing the second substrate 2) is not planarized by the curved surface of the plurality of convex lens portions 32. Therefore, the irregularities of the lens surface 36a are embedded on the lenticular lens structure 36 and the planarizing resin material having the optical transparency is applied and cured to form the planarizing layer 37, thereby planarizing top surface (lens surface 36a) of the lenticular lens structure 36.

As the planarizing resin material, a material having the different refractive index from the lenticular lens structure 36 is used. For example, when the refractive index of the lenticular lens structure 36 is defined as n1 and the refractive index of the planarizing resin material is defined as n3, a material which satisfies the relationship of refractive index n1>refractive index n3.

Such a light diffusion layer 3 may be formed such that the semi-cylindrical structure (plurality of convex lens portions 32) having a refractive index n1 is embedded into the transparent medium (planarizing layer 37) having refractive index n3. As a result, the light is refracted due to the difference between the refractive indexes of the plurality of convex lens portions 32 (refractive index n1) and the planarizing layer 37 (refractive index n3). In this time, since the plurality of convex lens portions 32 having a semi-cylindrical structure is formed toward the specific direction, the light is specifically diffused in the arrangement direction (Y direction) of the plurality of convex lens portions 32 and is rarely diffused in the vertical direction (Z direction).

That is, the light diffusion layer 3 of the present embodiment does not refract the light by the shape of the surface. Accordingly, as the film surface, the surface becomes the flat state, and the same light diffusion performance is obtained even when the light diffusion layer 3 is adhered to the second substrate 2.

As illustrated in FIG. 24, the first substrate 1 and the third substrate 8 are adhered to each other through a sealing member 501 which is provided on the peripheral portions thereof, and the third substrate 8 and the second substrate 2 are adhered to each other through a sealing member 502 which is provided on the peripheral portions thereof.

The daylighting device 40 of the present embodiment is manufactured separated from a complex glass structure portion 44 which is obtained by attaching the first substrate 1 and the third substrate 8 through a sealing member 501 and an attachment structure portion 45 including the light diffusion layer 3 and the sealing member 502 on the second substrate 2 and can have a configuration in which the attachment structure portion 45 is attached from the back to the complex glass structure portion 44. When attaching of the attachment structure portion 45, since the second substrate 2 is retrofitted such that the second substrate 2 is disposed on the outermost surface (indoor side), the light diffusion layer 3 is not exposed to the outermost surface of the daylighting device 40.

As the light diffusion layer 3 which can be used in the present embodiment, in addition to the product having the lenticular lens structure, a product having the pseudo-stripe structure or a product in which the fiber shape light diffusion particles which have the different refractive index such that the arrangement in one direction is provided in the light transmissive resin layer. The fiber shaped (or ellipsoidal shaped) light diffusion particle becomes a light scattering factor and the light beam which is incident to the light transmissive resin layer can be specifically diffused in the horizontal direction.

The hollow heat-insulating layer 6 is present between the light diffusion layer 3 and the third substrate 8. However, the lens surface 36a of the light diffusion layer 3 may be in contact with a second surface 8b of the third substrate 8.

The daylighting device 30 has a triple glass structure in which the third substrate 8 is disposed between the first substrate 1 and the second substrate 2. Accordingly, it is possible to improve the heat insulating properties rather than the configuration formed of the first substrate 1 and the second substrate 2.

Fifth Embodiment

Next, a daylighting device of a fifth embodiment will be described with reference to FIG. 26.

A basic configuration of a daylighting device 50 of the present embodiment to be described below is the same as that of fourth embodiment above and is different from the fourth embodiment in that the light diffusion layer 3 and the daylighting layer 4 are included in the second substrate 2 side. Therefore, in the following description, the difference feature of the configuration will be described in detail and the description of common portions as the first embodiment above will not be described. In addition, in each drawing to be used in the description, the same reference numerals are allocated to the common configuration element of FIG. 24.

Figure 26:
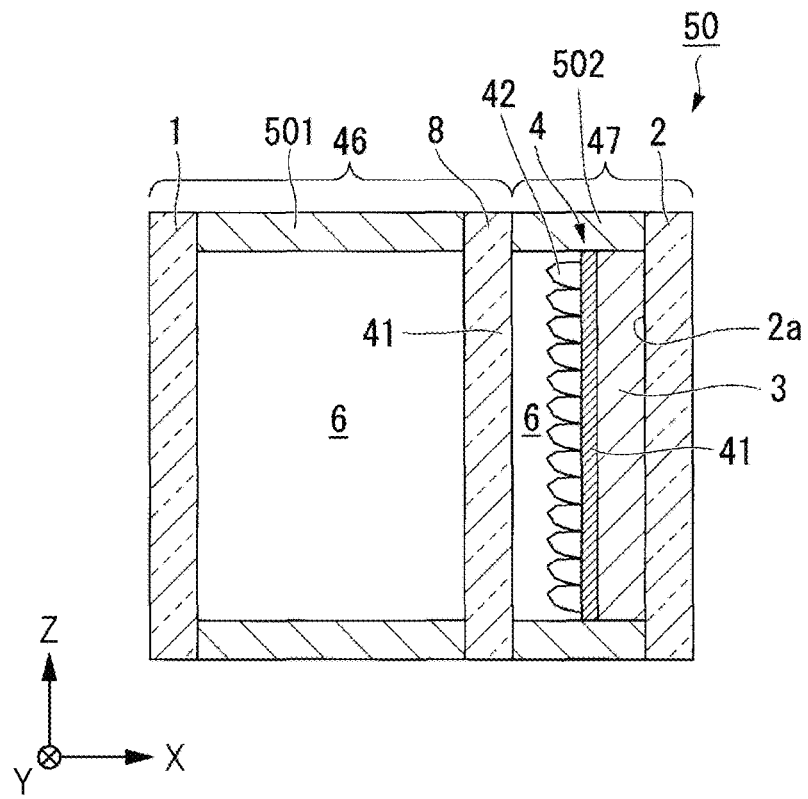
FIG. 26 is a cross-sectional view illustrating a schematic configuration of a daylighting device of a fifth embodiment.

FIG. 26 is a cross-sectional view illustrating a schematic configuration of a daylighting device of a fifth embodiment.

The daylighting device 50 of the present embodiment is configured by including the first substrate 1, the third substrate 8, and the second substrate 2 and the second substrate 2 includes the daylighting layer 4 and the light diffusion layer 3. The light diffusion layer 3 and the daylighting layer 4 are laminated on the second substrate 2 in order from the inner surface 2a, and the light diffusion layer 3 is present at the light emission side of the daylighting layer 4.

The daylighting device 50 of the present embodiment is manufactured separated from a complex glass structure portion 46 which is obtained by attaching the first substrate 1 and the third substrate 8 through a sealing member 501 and an attachment structure portion 47 including the light diffusion layer 3 and the sealing member 502 on the second substrate 2 and can have a configuration in which the attachment structure portion 47 is attached from the back to the complex glass structure portion 46. When attaching of the attachment structure portion 47, since the second substrate 2 is retrofitted such that the second substrate 2 is disposed on the outermost surface (indoor side), the light diffusion layer 3 and the daylighting layer 4 are not exposed to the outermost surface of the daylighting device 50.

According to the configuration of the present embodiment, as the complex glass structure portion 46 having a configuration in which a pair of substrates are simply attached to each other, a conventional multiple glass can be used.

Sixth Embodiment

Next, a daylighting device according to a sixth embodiment will be described with reference to FIG. 27.

A basic configuration of a daylighting device 60 of the present embodiment to be described below is the same as that of the fourth and fifth embodiments above and is different from the fourth and fifth embodiments in that the third substrate 8 includes the light diffusion layer 3 and the daylighting layer 4. Therefore, in the following description, the difference feature of the configuration will be described in detail and the description of common portions as the first embodiment above will not be described. In addition, in each drawing to be used in the description, the same reference numerals are allocated to the common configuration element of FIG. 24.

Figure 27:
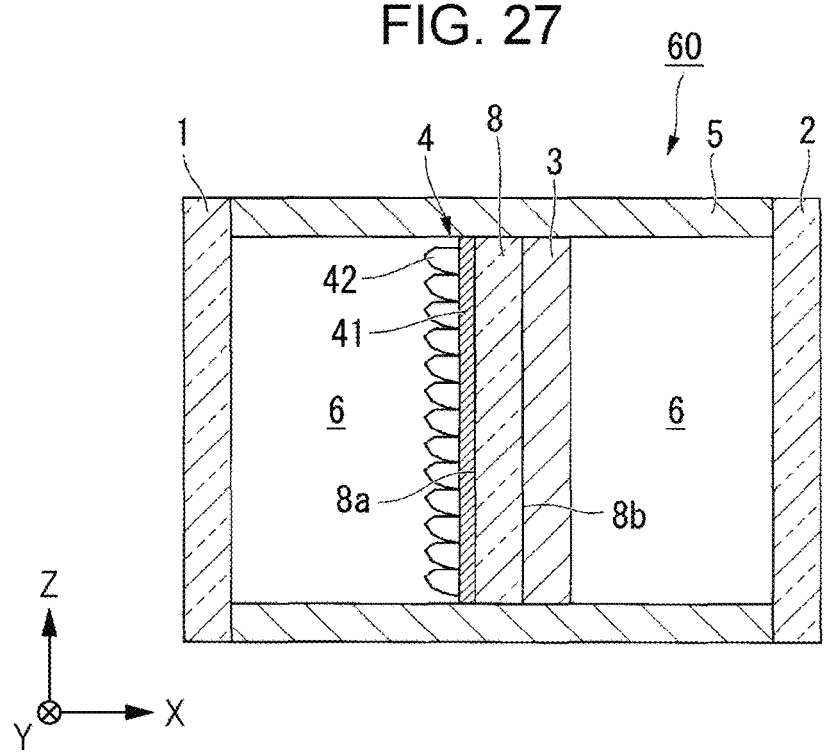
FIG. 27 is a cross-sectional view illustrating a schematic configuration of a daylighting device of a sixth embodiment.

FIG. 27 is a cross-sectional view illustrating a schematic configuration of a daylighting device of the sixth embodiment.

As illustrated in FIG. 27, the daylighting device 60 of the present embodiment is configured by including the first substrate 1, the second substrate 2 which is disposed facing the first substrate 1, the sealing member 5 for attaching the first substrate 1 and the second substrate 2, the third substrate 8 which is disposed between the first substrate 1 and the second substrate 2, the light diffusion layer 3, and the daylighting layer 4.

The third substrate 8, the light diffusion layer 3, and the daylighting layer 4 are disposed in the space which is surrounded by the first substrate 1, the second substrate 2, and the sealing member 5. The daylighting layer 4 is provided in the first surface 8a of the third substrate 8 (a surface facing the first substrate 1). The daylighting layer 4 is disposed in a posture that the daylighting portion 42 is toward the first substrate 1 side. The light diffusion layer 3 is provided on the second surface 8b of the third substrate 8 (a surface facing the second substrate 2).

The third substrate 8 is formed from the glass substrate having a slightly small size in the plan view than the first substrate 1 and the second substrate 2. As described above, the third substrate 8 is disposed in the hollow heat-insulating layer 6 between the first substrate 1 and the second substrate 2 and the distance from the first substrate 1 and the second substrate 2 is appropriately set.

In the present embodiment, the hollow heat-insulating layer 6, in which the third substrate 8 is present on the both side may not be separately provided. By providing the third substrate 8 so as to ensure the scalability, it becomes a state where two hollow heat-insulating layers 6 are separately dispersed and it is the tripe glass structure having more high heat insulating properties.

Seventh Embodiment

Next, a daylighting device according to a seventh embodiment will be described with reference to FIG. 28.

A basic configuration of a daylighting device 70 of the present embodiment to be described below is the same as that of the first embodiment above and is different from the first embodiment in that the third substrate 8 is supported to the second substrate 2 through the supporting member 71.

Therefore, in the following description, the difference feature of the configuration will be described in detail and the description of common portions as the first embodiment above will not be described. In addition, in each drawing to be used in the description, the same reference numerals are allocated to the common configuration elements of FIGS. 1 to 9.

Figure 28:
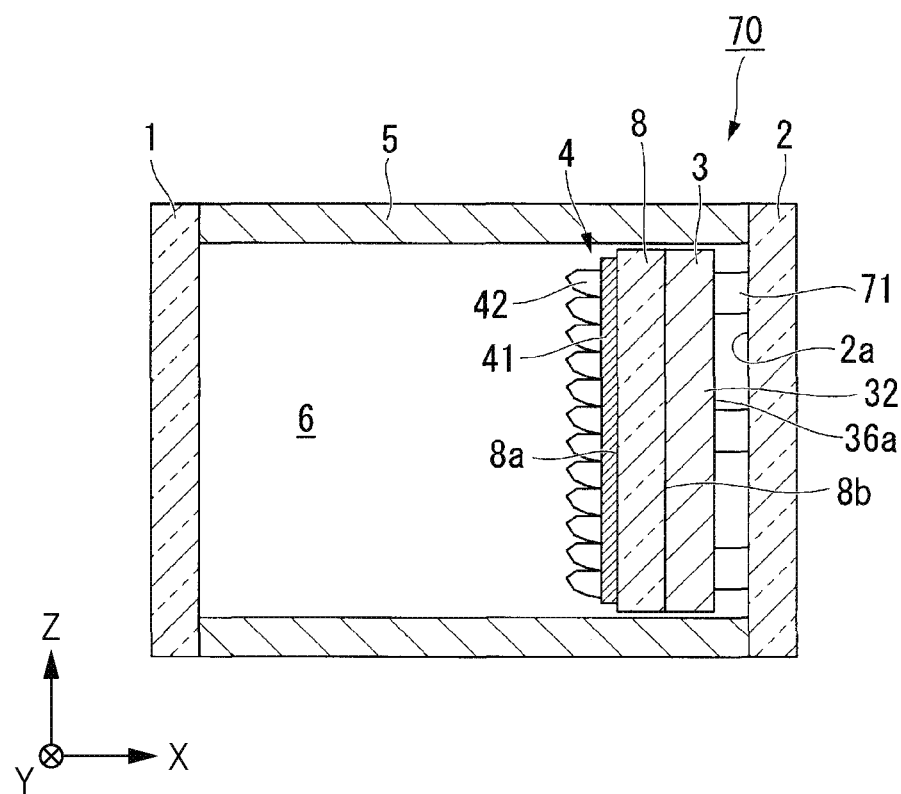
FIG. 28 is a cross-sectional view illustrating a schematic configuration of a daylighting device of a seventh embodiment.

FIG. 28 is a cross-sectional view illustrating a schematic configuration of a daylighting device of the seventh embodiment.

The daylighting device 70 of the present embodiment is supported in a state where the third substrate 8 is floated in the hollow heat-insulating layer 6 in which the first substrate 1 and the second substrate 2 are attached to each other through the sealing member 5.

The third substrate 8 includes the daylighting layer 4 to the first surface 8a and light diffusion layer 3 to the second surface 8b and the light diffusion layer 3 and the daylighting layer 4 are integrally formed. The third substrate 8 is fixed to the inner surface 2a of the second substrate 2 through the supporting member 71 which is provided on the light diffusion layer 3 side. The third substrate 8 is supported in a state where the third substrate 8 is separated at a distance with respect to the second substrate 2, and the air of the hollow heat-insulating layer 6 is present between the third substrate 8 and the second substrate 2. In addition, any of the peripheral portions in the third substrate 8, the light diffusion layer 3, and the daylighting layer 4 are separated from the sealing member 5 and is supported and fixed to the second substrate 2 in a state where the peripheral portion is float in the art.

In the present embodiment, the light diffusion layer 3 formed of the lenticular lens structure is adopted and it is a state where irregularities of the plurality of convex lens portions 32 (not shown) is shown in the surface (lens surface 36a) facing the second substrate 2. Accordingly, the surface of the light diffusion layer 3 (lens surface 36a) cannot be directly attached to the inner surface 2a of the second substrate 2. In the present embodiment, the supporting member 71 is formed by providing a dot shaped or line shaped adhesion material on the surface of the light diffusion layer 3 (lens surface 36a) and the light diffusion layer 3 is attached to the second substrate 2 through the supporting member 71.

Since in the daylighting layer 4, the film base material 41 side is attached to the first surface 8a of the third substrate 8, the daylighting portion 42 is toward the first substrate 1 side.

Figure 29A:
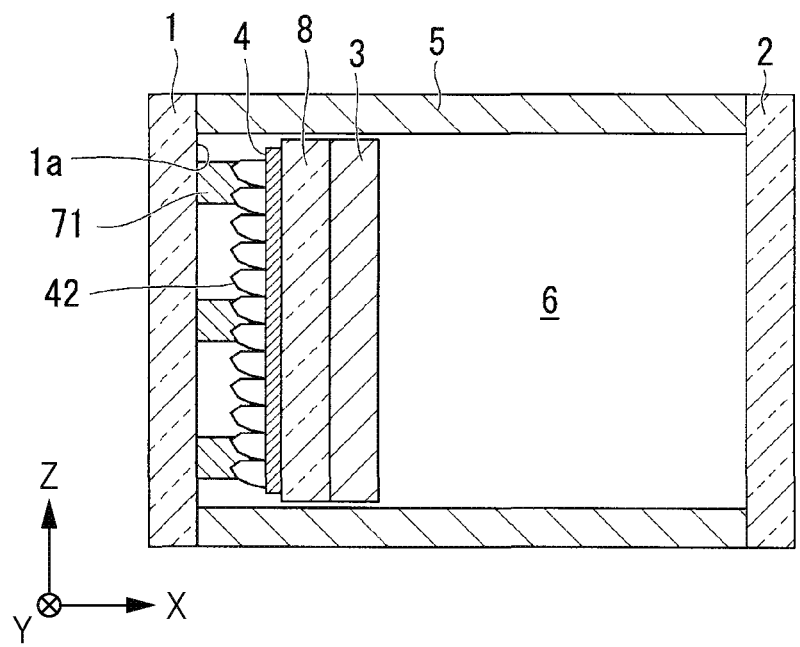
FIG. 29A is a first diagram illustrating a modification example of the daylighting device of the seventh embodiment.
Figure 29B:
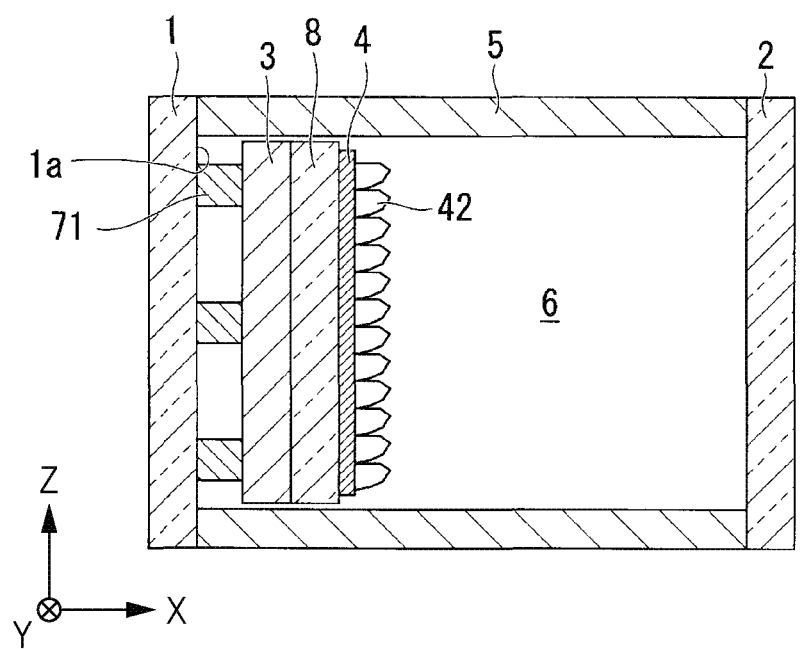
FIG. 29B is a second diagram illustrating a modification example of the daylighting device of the seventh embodiment.

In addition, in the present embodiment, the third substrate 8 including the light diffusion layer 3 and the daylighting layer 4 has a configuration in which the third substrate 8 is supported to the second substrate 2 side through the supporting member 71, as illustrated in FIGS. 29A and 29B, the third substrate 8 has a configuration in which the third substrate 8 is supported to the first substrate 1 side.

In FIG. 29A, the third substrate 8 including the light diffusion layer 3 and the daylighting layer 4 is fixed to the inner surface 1a of the first substrate 1 through the supporting member 71 which is provided on the daylighting layer 4 in a state where the daylighting layer 4 side is facing the first substrate 1.

In FIG. 29B, the above-described third substrate 8 including the light diffusion layer 3 and the daylighting layer 4 is supported and fixed to the inner surface 1a of the first substrate 1 through the supporting member 71 which is provided on the light diffusion layer 3 in a state where the light diffusion layer 3 side is facing the first substrate 1.

As the light diffusion layer 3, a light diffusion layer having the pseudo-stripe structure or a light diffusion layer which disperses the fiber shape light diffusion particles in the resin medium.

Eighth Embodiment

Next, an eighth embodiment in the present embodiment will be described.

Figure 30:
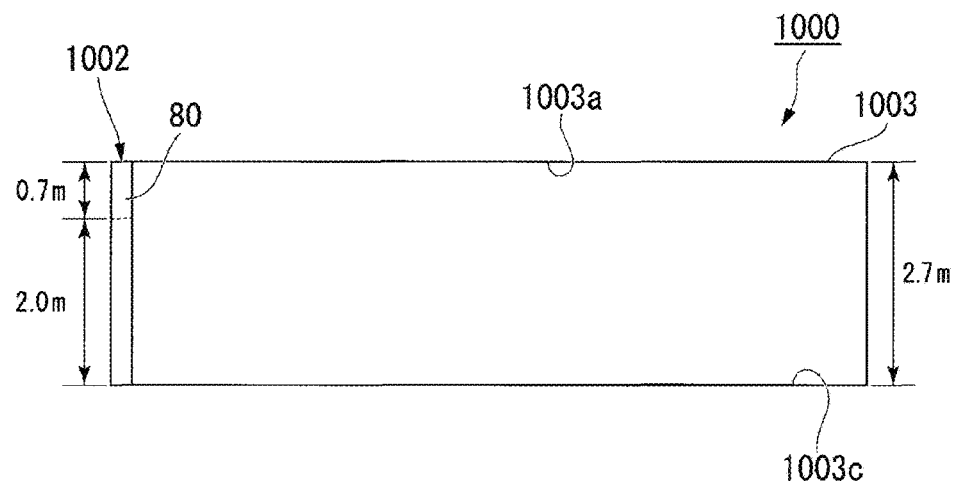
FIG. 30 is a schematic diagram illustrating the room model in which the daylighting device is disposed in the example.

FIG. 30 is a schematic diagram illustrating the room model in which a daylighting device 80 is disposed. In the daylighting device 80, at least of the daylighting devices among the above-described embodiments is used.

As illustrated in FIG. 30, a room model 1000 has a structure that one surface of a wall is occupied by a window from a floor 1003c to a ceiling 1003a. The daylighting device 80 configures a part of the multiple glass window 1002 which is disposed on the window of the room 1003. The daylighting device 80 is disposed at the upper portion of the multiple glass window 1002 that is a position having a height higher than 2 m from the floor 1003c. In the current office, since a case where the height from the floor to the ceiling is about 2.7 m is normal, the daylighting device 80 is disposed at a position having a height of above 70 cm depart from the ceiling.

The most of the light beams to be incident to the indoor side from the outdoor side through the daylighting device 80 are refracted toward indoors in a ceiling direction by a function of a daylighting device 100 and becomes indirect illumination light which illuminates indoors.

The multiple glass window 1002 may have a structure including a separated daylighting device at the upper portion of a simple pair glass structure and may have a structure in which the daylighting layer 4 and the light diffusion layer 3 are attached only the upper portion between the multiple glasses.

Figure 31:
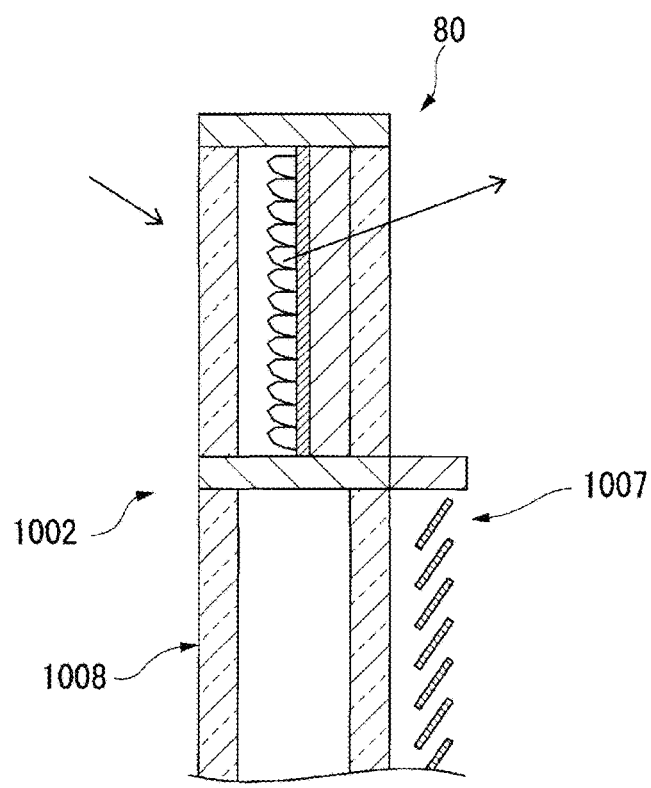
FIG. 31 is a diagram illustrating an action of the daylighting device in the room model of the example.

FIG. 31 is a diagram illustrating an action of the daylighting device in the room model of the present example.

Here, a window shade 1007 is provided only a portion of a pair glass structure 1008 of the multiple glass window 1002 and the window shade 1007 is not provided on the daylighting device 100 side.

As illustrated in FIG. 31, by the daylighting device 80 which is disposed at the upper portion of the multiple glass window 1002, the external light entering indoors can be refracted toward the ceiling with good efficiency. Accordingly, even in a state where the window shade 1007 which is provided at a lower portion (pair glass structure side) of the multiple glass window 1002 is closed, indoors is not darken. As a result, it is not necessary to turn on a light bulb in the indoor in day time. Accordingly, the power to be consumed by the daylighting equipment in the daylight can be reduced.

In addition, most part of the light beam which is lighted in the daylighting device 80 which is provided in a position higher than 2.0 m from the floor indoors is refracted and entire reflected in the daylighting layer 4 and is toward indoors in a ceiling direction. Accordingly, it is considered that the light passing through the daylighting device 80 is rarely entered to the visual field of the person indoors.

In a case of adopting the daylighting structure using the light diffusion properties, there are a lot of cases that the person indoors senses the glare. However, since the daylighting device according to the above-described embodiments has a structure in which the light is specifically dispersed to the room in the horizontal direction, the person indoors does not sense the glare.

In addition, from the viewpoint of the privacy or the viewpoint of the light shielding purpose, the window shade 1007 is disposed to the window glass in some cases. However, in a case where the window shade 1007 is provided so as to cover one surface of the window, when closing the window shade 1007 for preventing the solar light from being entered indoors, entire the room becomes darker. Accordingly, eventually, it is necessary to turn on the illumination, although in the daylight.

In addition, when viewing the multiple glass window 1002 from the indoor side, since the window is made of an opaque "frosted glass" in a portion of the daylighting device 80, it is difficult to visually recognize the outdoor side.

From such the properties, the daylighting device 80 in the present example is effective in terms of protecting the privacy. On the other hand, the brightness indoors, the illumination light can be held by daylighting the external light indoors in the daylighting device 80 with good efficiency while shielding the external light which is directed entered to the eyes of a person who is in the room by the window shade 1007.

Since the daylighting device 80 in the present example has characteristics for diffusing the light in the horizontal direction of the room by the light diffusion layer 3, it is possible to relieve the temporal dependence or the season dependence of the daylighting state by the solar altitude. Accordingly, the stabilized light environment can be obtained. Accordingly, since it is not required to adjust the opening and closing state of the window shade 1007 according to the solar altitude, it can save the trouble.

In addition, by providing the daylighting device 80 to entire the window, it is useful to a case where it is not preferable to provide the window shade 1007 or a case where it is difficult to perform the opening and closing operation of the window shade 1007.

Since the more light beams can be incident indoors by disposing the daylighting device 80 to the window in which the external light is difficult for entering, the room can be brighten than a case of using the window glass having a simple pair glass structure.

Regarding the setting of the disposing position of the daylighting device 80 or setting of a configuration in which the daylighting device is occupied with respect to the window, it is freely changed according to the purpose of the room.

[Illumination Dimming System]

Figure 32:
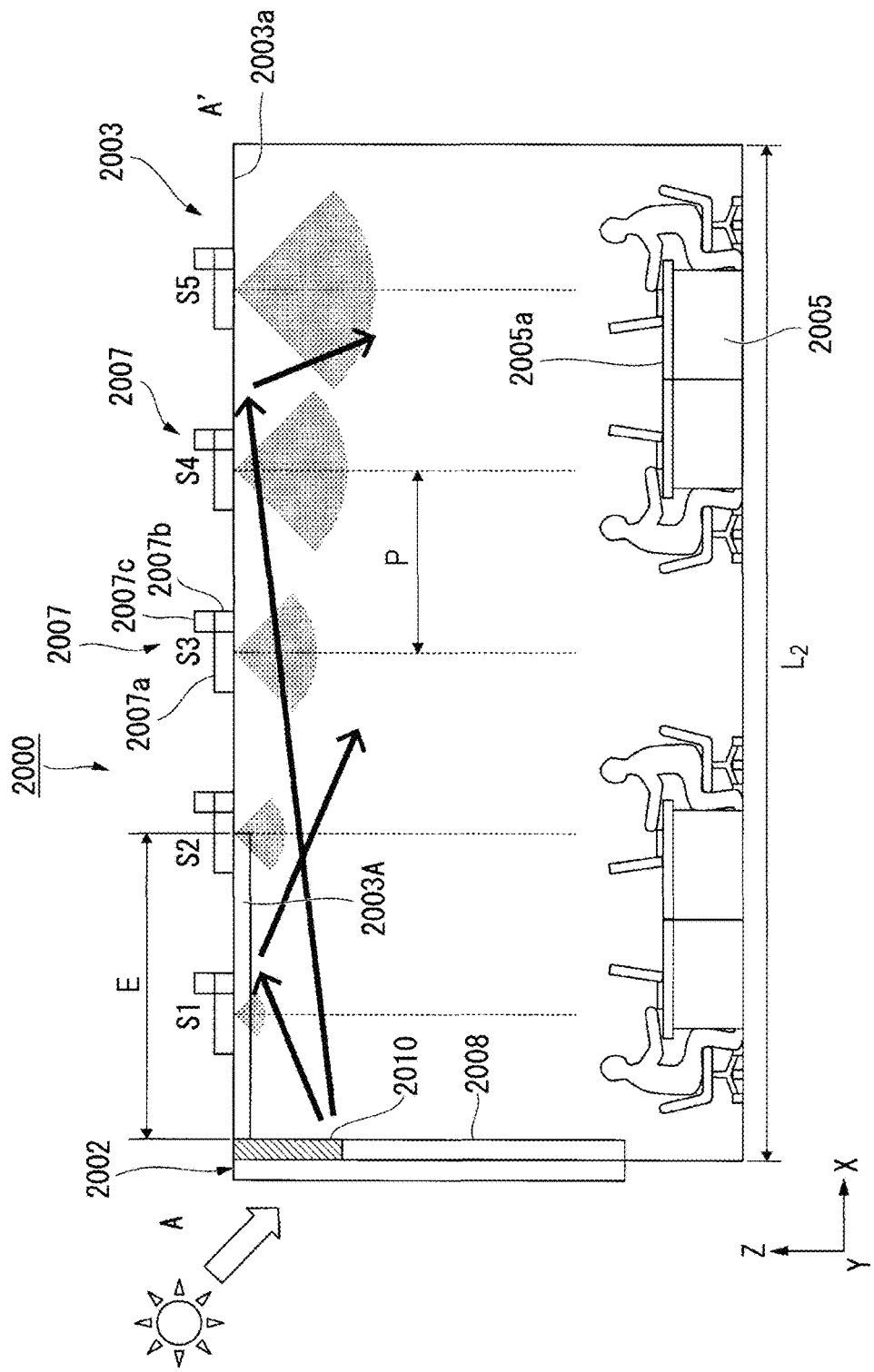
FIG. 32 is a diagram illustrating a room model including the daylighting device and an illumination dimming system and is a cross-sectional view along a line A-A'.

FIG. 32 is a diagram illustrating a room model 2000 including the daylighting device and an illumination dimming system and is a cross-sectional view along a line J-J' of FIG. 33.

FIG. 33 is a plan view illustrating a ceiling of the room model 2000.

In the present invention, a ceiling material configuring a ceiling 2003a of a room 2003 to which the external light is incident may have the high light diffusion properties. As illustrated in FIGS. 32 and 33, a light reflecting ceiling material 2003A is disposed in the ceiling 2003a of the room 2003 as the ceiling material having the light reflecting properties. Since the light reflecting ceiling material 2003A is aimed to promote entering the external light from a daylighting device 2010 which is disposed on a window 2002 to the back indoors, the light reflecting ceiling material 2003A is disposed in the ceiling 2003a at the window. Specifically, the light reflecting ceiling material 2003A is disposed at a predetermined region E (a region which is away from a distance of about 3 m from the window 2002) of the ceiling 2003a.

As described above, the light reflecting ceiling material 2003A serves to guide the external light which is induced indoors through the window 2002, in which the daylighting device 2010 (any one of the daylighting devices described above) of the invention is disposed, to the back of the indoor with good efficiency. The external light which is induced from the daylighting device 2010 toward the ceiling 2003a indoors is reflected to the light reflecting ceiling material 2003A, and by illuminating a top surface of a desk 2005a of a desk 2005 which is placed on the back of the indoor by changing the direction of the external light, it is possible to exhibit the effect for brightening the top surface of a desk 2005a.

The light reflecting ceiling material 2003A may have diffusion reflectivity and may have specularity. In order to have the effect for brightening the top surface of a desk 2005a of the desk 2005 which is placed on the back indoors and the effect for suppressing the glare light which is uncomfortable to the person in the indoor, it is preferable that the both characteristics is appropriately combined.

The most of the light beams which are incident to the indoor by the daylighting device 2010 of the present invention is toward the ceiling adjacent to the window 2002. The amount of the light around the window 2002 is sufficient, in some cases. Accordingly, by using the above-described light reflecting ceiling material 2003A, the light which is incident to the ceiling (region E) around the window can be separated to the back indoors which has small light amount compared to the window side.

The light reflecting ceiling material 2003A is prepared, for example, by performing an embossing process by irregularities of about several tens of the microns on the metal plate such as aluminum, and by evaporating a metal thin film such as aluminum to the surface of a resin substrate to which the same irregularities are formed. Alternatively, the irregularities which are formed by embossing process are formed by a curved surface in which the cycle is long.

Furthermore, by appropriately changing the embossed shape to be formed in the light reflecting ceiling material 2003A, it is possible to suppress the light distribution characteristics of the light or the distribution of the light indoors. For example, in a case where the embossing process is carried out into a strip shape extending to the back of the indoor, the light reflected to the light reflecting ceiling material 2003A is spread in the horizontal direction (a direction intersecting the longitudinal direction of the irregularities) of the window 2002. In a case where the size or the direction of the window 2002 of the room 2003 is limited, by using the properties, the light is dispersed to the horizontal direction by the light reflecting ceiling material 2003A and can be reflected toward the direction of the back indoors.

The daylighting device 2010 of the present invention is used as a part of the illumination dimming system of the room 2003. The illumination dimming system is, for example, configured from a configuring member of the entire room including the daylighting device 2010, a plurality of indoor illumination device 2007, a solar insolation adjustment device 2008 which is disposed in the window, control systems thereof, the light reflecting ceiling material 2003A which is disposed in the ceiling 2003a.

In the window 2002 of the room 2003, the daylighting device 2010 is disposed at the upper portion side, and the solar insolation adjustment device 2008 is disposed at the lower portion side. Here, as the solar insolation adjustment device 2008, the window shade is disposed. However, it is not limited thereto.

The plurality of indoor illumination devices 2007 is disposed in the room 2003 in a lattice pattern in the horizontal direction of the window 2002 (Y direction) and the depth direction indoors (X direction). The plurality of indoor illumination devices 2007 configures the entire illumination system of the room 2003 together with the daylighting device 2010.

As illustrated in FIGS. 32 and 33, for example, the ceiling 2003a of the office having a length $L_1$ of the window 2002 in the horizontal direction (Y direction) is 18 m and a length $L_2$ of the room 2003 in the depth direction (X direction) is 9 m is illustrated. Here, the indoor illumination device 2007 is disposed in a lattice pattern at a distance P of 1.8 m, respectively, in the transverse direction (Y direction) and the depth direction (X direction) of the ceiling 2003a.

More specifically, 50 indoor illumination devices 2007 are arranged in 10 columns (Y direction)×5 rows (X direction).

The indoor illumination device 2007 includes indoor daylighting equipment 2007a, a brightness detecting unit 2007b, and a control unit 2007c, and has a configuration in which the brightness detecting unit 2007b and control unit 2007c are integrally formed in the indoor daylighting equipment 2007a.

The indoor illumination device 2007 may include a plurality of the indoor daylighting equipment 2007a and the brightness detecting units 2007b. However, the brightness detecting unit 2007b is provided one by one with respect to each of the indoor daylighting equipment 2007a. The brightness detecting unit 2007b receives the reflected light of the surface to be illuminated by the indoor daylighting equipment 2007a to detect the illuminance of the surface to be illuminated. Here, the illuminance of the top surface of a desk 2005a of the desk 2005 placed indoors is detected by the brightness detecting unit 200b.

Control units 2007c which are provided in each of the indoor illumination devices 2007 one by one is connected to each other. Each indoor illumination device 2007 performs a feedback control adjusting the light output of each of LED lamps indoors daylighting equipment 2007a by the control units 2007c which are connected to each other, such that the illuminance of the top surface of a desk 2005a to be detected by each brightness detecting unit 2007b to be a certain target illuminance L0 (for example, average illuminance: 750 lx).

FIG. 34 is a graph illustrating a relationship between an illuminance of light (natural light) lighted indoors due to the daylighting device and an illuminance (illumination dimming system) due to an indoor illumination device.

As illustrated in FIG. 34, an illuminance of the surface of the desk caused by the light lighted by the daylighting device 2010 is high as approaching nearer to the window and the effect is degraded more distant from the window. In the room which the daylighting device 2010 of the present invention is applied, the illumination distribution to the depth direction of the room is generated by the natural light from the window in the day time. The daylighting device 2010 of the present invention is used together with the indoor illumination device 2007 which compensates the indoor illumination distribution. The indoor illumination device 2007, which is disposed in the indoor ceiling, detects the average illuminance lower each of the devices by the brightness detecting unit 2007b and is turned on by dimming controlling such that the illuminance of the top surface of the desk in entire the room to be a certain target illuminance L0. Accordingly, almost of a S1 row and a S2 row which are disposed around the window are not turned on, and are turned on while increasing the power toward a S3 row, a S4 row, and a S5 row in a back direction of the room. As a result, the top surface of the desk in the room is illuminated in a total of the illuminance due to the natural light and the illumination due to the indoor illumination device 2007, the illuminance 750 lx ("JIS Z9110 illumination general provision") that is the illuminance of the top surface of the desk which is suitable for working across the room.

As described above, by using the daylighting device 2010 and the illumination dimming system (indoor illumination device 2007), light can be reached in the back indoors, the brightness indoors can further be improved, and a sufficient illuminance of a surface of a desk can be secured in terms of the office across the room. Accordingly, a bright light environment which is more stabilized without affecting due to the season or the weather can be obtained.

Although a variety of embodiments has been described with reference to the accompanying drawings, it is needless to say that the invention is not limited to the examples. It is apparent to those skilled in the art that various modification examples and improvements may be obtained by contemplations within the scope of the disclosed claims, and thereby it is also understood that all those fall within the technical scope of the invention without any doubt. The configurations of each of the embodiments may be appropriately combined.

For example, the disposing place of the daylighting layer 4, the light diffusion layer 3, the third substrate 8, or the like may be appropriately changed.

INDUSTRIAL APPLICABILITY

An aspect of the present invention can be applied to a daylighting device which is required to maintain insulating properties and which requires obtaining of a stabilized bright light environment without being affected by the solar light can be provided.

REFERENCE SIGNS LIST

1 FIRST SUBSTRATE
2 SECOND SUBSTRATE
8 THIRD SUBSTRATE
3 LIGHT DIFFUSION LAYER (FIRST LIGHT DIFFUSION LAYER)
301 LIGHT DIFFUSION LAYER (SECOND LIGHT DIFFUSION LAYER)
3A, 42A FIRST SIDE
3a, 36a SURFACE
4 DAYLIGHTING LAYER
7 UV PROTECTING FILM (ULTRAVIOLET PROTECTING LAYER)
8a FIRST SURFACE

8b SECOND SURFACE
L EXTERNAL LIGHT
L1 DIFFUSED LIGHT
10, 11, 20, 30, 40, 50, 60, 70, 100, 1001 DAYLIGHTING DEVICE
31a, 41a ONE SURFACE
32 CONVEX LENS (CONVEX PORTION)
33 CONVEX PORTION
34 LIGHT TRANSMISSIVE RESIN LAYER (LIGHT TRANSMISSIVE RESIN)
35 LIGHT DIFFUSION PARTICLE
36 LENTICULAR LENS STRUCTURE
37 PLANARIZING LAYER
42 DAYLIGHTING PORTION
42c INTERFACE (AIR INTERFACE)
42c AIR INTERFACE
43 VOID PORTION
71 SUPPORTING MEMBER
n1, n3 REFRACTIVE INDEX

The invention claimed is:

1. A daylighting device comprising:
a first substrate which has optical transparency and to which external light is incident;
a second substrate which has optical transparency and is disposed facing the first substrate;
a first light diffusion layer which has optical transparency and is disposed between the first substrate and the second substrate; and
a daylighting layer which is disposed between the first substrate and the second substrate and is formed by including
a plurality of daylighting portions having optical transparency and
a void portion which is provided between the plurality of daylighting portions in a first surface facing the first light diffusion layer,
wherein the first light diffusion layer
strongly distributes, in a first direction along which each of the plurality of daylighting portions extend, the external light incident from the first substrate, and
emits, toward the second substrate, the external light diffused.

2. The daylighting device according to claim 1,
wherein the first light diffusion layer shows weak light diffusion properties having 5 degrees or less of a full width at half maximum in a second direction perpendicular to the first direction.

3. The daylighting device according to claim 1,
wherein as properties of light diffusion in a second direction perpendicular to the first direction, the first light diffusion layer serves as a reflective surface in which a part of a side surface of one of the plurality of daylighting portions adjacent to the void portion reflects light which is incident to the plurality of daylighting portions, the light passes through a point G in which one arbitrary light beam among light beams which are incident to the plurality of daylighting portions is incident to the reflective surface, and in a case where among two spaces which use a virtual straight line which is perpendicular to a second surface of the first substrate as a boundary, a first space is at a first side where the one arbitrary light beam is present and a second space is at a second side where the one arbitrary light beam is not present, a diffusion intensity of light travelling in a third direction at a polar angle of 5 degrees with respect to a straight line that is a light travelling a third side of the second space among the light beams emitted from the plurality of daylighting portions is 0.1% to 10% of an intensity of light travelling along the straight line.

4. The daylighting device according to claim 1, the daylighting device further comprising:
a third substrate which is disposed between the first substrate and the second substrate.

5. The daylighting device according to claim 4,
wherein the first light diffusion layer is disposed at a light emission side of the daylighting layer.

6. The daylighting device according to claim 5,
wherein the daylighting layer and the first light diffusion layer are provided in a second surface of the second substrate facing the first substrate.

7. The daylighting device according to claim 5,
wherein the daylighting layer is provided on a second surface of the third substrate facing the first substrate, and
wherein the first light diffusion layer is provided on a third surface of the second substrate facing the third substrate.

8. The daylighting device according to claim 5,
wherein the first light diffusion layer and the daylighting layer are laminated on a second surface of the second substrate facing the third substrate.

9. The daylighting device according to claim 5,
wherein the daylighting layer is provided on a second surface of the third substrate facing the first substrate, and
wherein the first light diffusion layer is provided on a third surface of the third substrate facing the second substrate.

10. The daylighting device according to claim 5,
wherein the daylighting layer is on a second surface of the third substrate facing the first substrate,
wherein the first light diffusion layer is on a third surface of the third substrate facing the second substrate, and
wherein the third substrate is supported at a distance with respect to at least one of the first substrate and the second substrate through a supporting member which is provided at a first side of the first light diffusion layer.

11. The daylighting device according to claim 1,
wherein the first light diffusion layer is disposed on a light incident side of the daylighting layer.

12. The daylighting device according to claim 11,
wherein the first light diffusion layer is provided on a second surface of the first substrate facing the second substrate, and
wherein the daylighting layer is provided on a third surface of the second substrate facing the first substrate.

13. The daylighting device according to claim 12, the daylighting device further comprising:
a second light diffusion layer showing weak light diffusion properties than that of the first light diffusion layer,
wherein the second light diffusion layer is disposed between the second substrate and the daylighting layer.

14. The daylighting device according to claim 1,
wherein the first light diffusion layer is configured of
a light transmissive resin and
a plurality of light diffusion particles which have different refractive indexes from the light transmissive resin, and
wherein each of the plurality of light diffusion particles forms an anisotropic shape having a long axis and a short axis.

15. The daylighting device according to claim 1,
wherein the first light diffusion layer is formed of a plurality of convex portions extending in one direction.

16. The daylighting device according to claim 15,
wherein the plurality of convex portions are formed of lenticular lens structure.

17. The daylighting device according to claim 16, the daylighting device further comprising:
a planarizing layer planarizing a second surface of the lenticular lens structure,
wherein the planarizing layer is formed of a material having a first refractive index different from a second refractive index of the lenticular lens structure.

18. The daylighting device according to claim 1, the daylighting device further comprising:
an ultraviolet protecting layer is-provided on the first substrate.

19. The daylighting device according to claim 1,
wherein the plurality of daylighting portions are formed of a polygonal-shaped structure,
a cross-sectional shape perpendicular to a longitudinal direction has a plurality of apexes, has a polygonal shape in which all of inner angles are less than 180°, and
the polygonal shape includes
a second surface facing a third surface of the second substrate,
first and second apexes corresponding to both ends of the second surface and
a third apex which is not positioned on the second surface, and
wherein the daylighting layer is provided in a posture in which an air interface at the third apex side is provided toward the first substrate side.

* * * * *